US011774657B2

(12) United States Patent
Ayres et al.

(10) Patent No.: US 11,774,657 B2
(45) Date of Patent: Oct. 3, 2023

(54) SPATIALLY VARYING SKEW MIRRORS

(71) Applicant: Akonia Holographies LLC, Longmont, CO (US)

(72) Inventors: Mark R. Ayres, Boulder, CO (US); Adam Urness, Louisville, CO (US); Kenneth E. Anderson, Longmont, CO (US); Friso Schlottau, Lyons, CO (US)

(73) Assignee: Akonia Holographics LLC, Longmont, CO (US)

( * ) Notice: Subject to any disclaimer, the term of this patent is extended or adjusted under 35 U.S.C. 154(b) by 1155 days.

(21) Appl. No.: 16/339,297

(22) PCT Filed: Oct. 12, 2017

(86) PCT No.: PCT/US2017/056404
§ 371 (c)(1),
(2) Date: Apr. 3, 2019

(87) PCT Pub. No.: WO2018/071714
PCT Pub. Date: Apr. 19, 2018

(65) Prior Publication Data
US 2019/0293853 A1   Sep. 26, 2019

Related U.S. Application Data

(63) Continuation-in-part of application No. PCT/US2017/020087, filed on Mar. 1, 2017.
(Continued)

(51) Int. Cl.
*G02B 5/32* (2006.01)
*G02B 5/18* (2006.01)
(Continued)

(52) U.S. Cl.
CPC ............. *G02B 5/32* (2013.01); *G02B 5/1814* (2013.01); *G02B 5/1819* (2013.01);
(Continued)

(58) Field of Classification Search
CPC ...... G02B 5/32; G02B 5/1814; G02B 5/1819; G02B 5/1857; G02B 5/1861; G03H 1/0248; G03H 1/0402; G03H 2001/0439
See application file for complete search history.

(56) References Cited

U.S. PATENT DOCUMENTS 4,017,158 A   4/1977   Booth
6,137,602 A * 10/2000  Mukawa ................. G02B 5/32
                                                          359/13
(Continued)

FOREIGN PATENT DOCUMENTS

CN   1841524 A   10/2006
CN   1940610 A   4/2007
(Continued)

*Primary Examiner* — Kimberly N. Kakalec
(74) *Attorney, Agent, or Firm* — Michael H. Lyons

(57) ABSTRACT

A skew mirror is an optical reflective device whose reflective axis forms a non-zero angle with the surface normal. A spatially varying skew mirror is a skew mirror whose reflective axes vary as a function of lateral position. If a spatially varying skew mirror was subdivided into many pieces, some or all of the many pieces could have a reflective axis that points in a different direction. In some variations, a spatially varying skew mirror can act as a focusing mirror that focuses incident light. A spatially varying skew mirror can be made by recording interference patterns between a phase-modulated writing beam and another writing beam or by recording interference patterns between planar wavefronts in a curved holographic recording medium that is later bent or warped.

12 Claims, 18 Drawing Sheets

Related U.S. Application Data

(60) Provisional application No. 62/435,676, filed on Dec. 16, 2016, provisional application No. 62/407,994, filed on Oct. 13, 2016, provisional application No. 62/407,398, filed on Oct. 12, 2016.

(51) Int. Cl.
  *G03H 1/02* (2006.01)
  *G03H 1/04* (2006.01)

(52) U.S. Cl.
  CPC ......... *G02B 5/1857* (2013.01); *G02B 5/1861* (2013.01); *G03H 1/0248* (2013.01); *G03H 1/0402* (2013.01); *G03H 2001/0439* (2013.01)

(56) References Cited

U.S. PATENT DOCUMENTS

| | | | |
|---|---|---|---|
| 7,139,109 B2 | 11/2006 | Mukawa | |
| 7,418,170 B2 | 8/2008 | Mukawa et al. | |
| 7,502,168 B2 | 3/2009 | Akutsu et al. | |
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 9,651,368 B2 | 5/2017 | Abovitz et al. | |
| 2002/0191394 A1 | 12/2002 | Coleman et al. | |
| 2009/0303212 A1 | 12/2009 | Akutsu et al. | |
| 2012/0250306 A1* | 10/2012 | Sugiyama | G09G 3/025 362/293 |
| 2013/0038935 A1 | 2/2013 | Moussa et al. | |
| 2013/0250430 A1 | 9/2013 | Robbins et al. | |
| 2014/0140654 A1 | 5/2014 | Brown et al. | |
| 2014/0185115 A1* | 7/2014 | An | G03H 1/0476 359/22 |
| 2014/0218801 A1 | 8/2014 | Simmonds et al. | |
| 2016/0104996 A1 | 4/2016 | Klennert | |
| 2016/0154150 A1 | 6/2016 | Simmonds et al. | |
| 2017/0031160 A1 | 2/2017 | Popovich et al. | |
| 2017/0240112 A1* | 8/2017 | Chen | G02B 27/0149 |
| 2017/0276940 A1 | 9/2017 | Popovich et al. | |
| 2018/0284440 A1* | 10/2018 | Popovich | G02B 6/0035 |
| 2019/0094981 A1 | 3/2019 | Bradski et al. | |

FOREIGN PATENT DOCUMENTS

| | | |
|---|---|---|
| CN | 102305953 A | 1/2012 |
| CN | 102809821 A | 12/2012 |
| CN | 102928981 A | 2/2013 |
| CN | 103370659 A | 10/2013 |
| CN | 103823267 A | 5/2014 |
| CN | 203673215 U | 6/2014 |

* cited by examiner

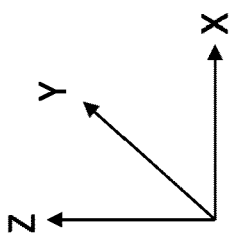
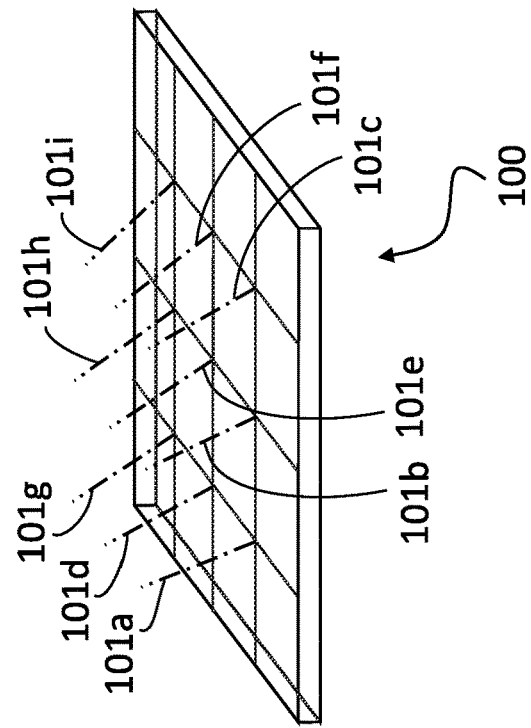
FIG. 1B
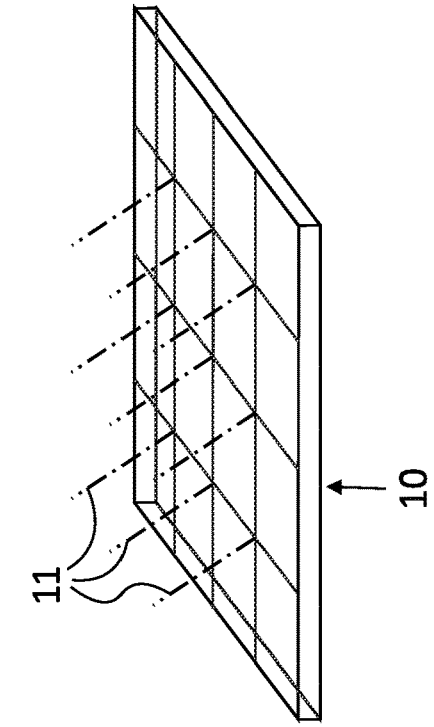
FIG. 1A

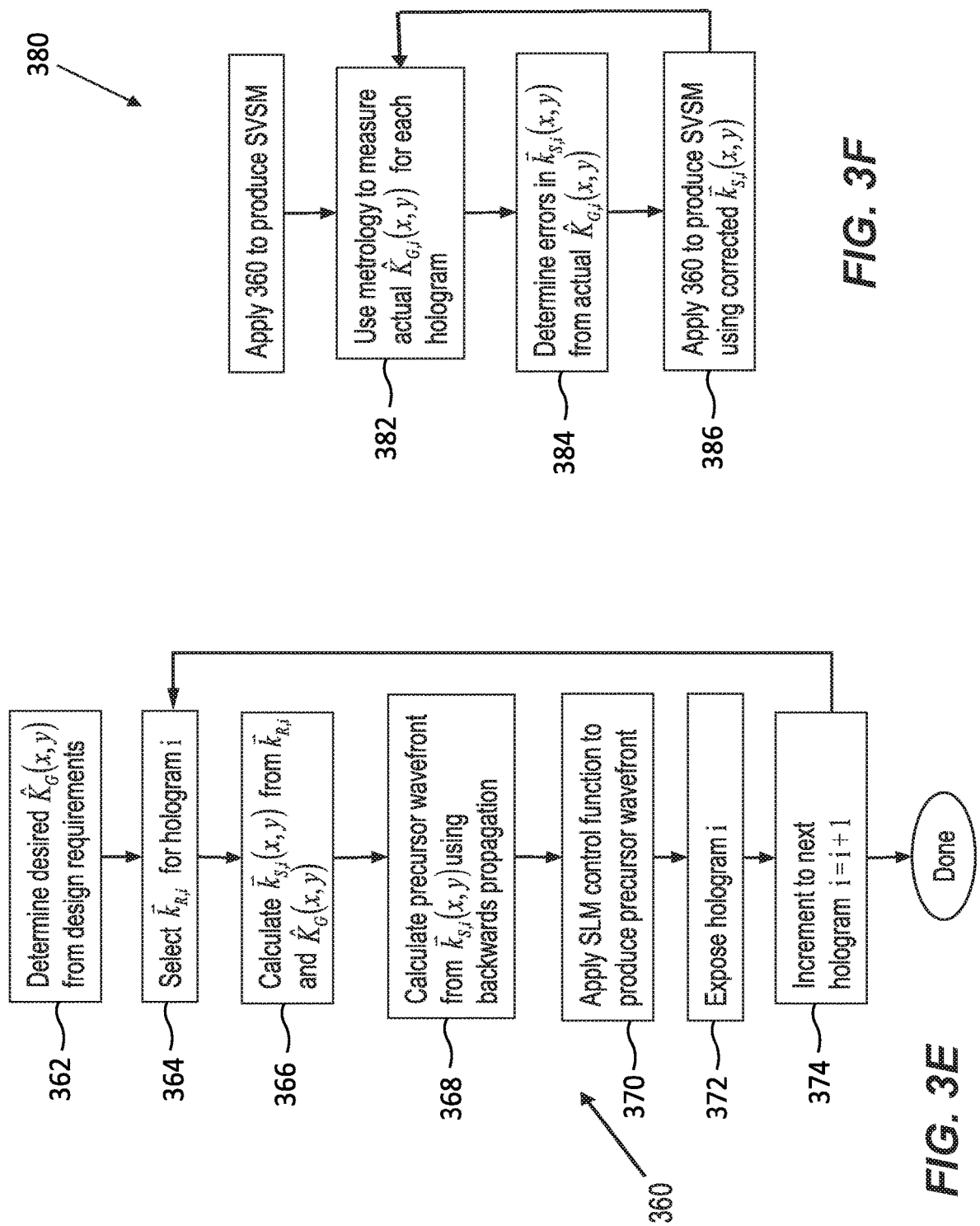

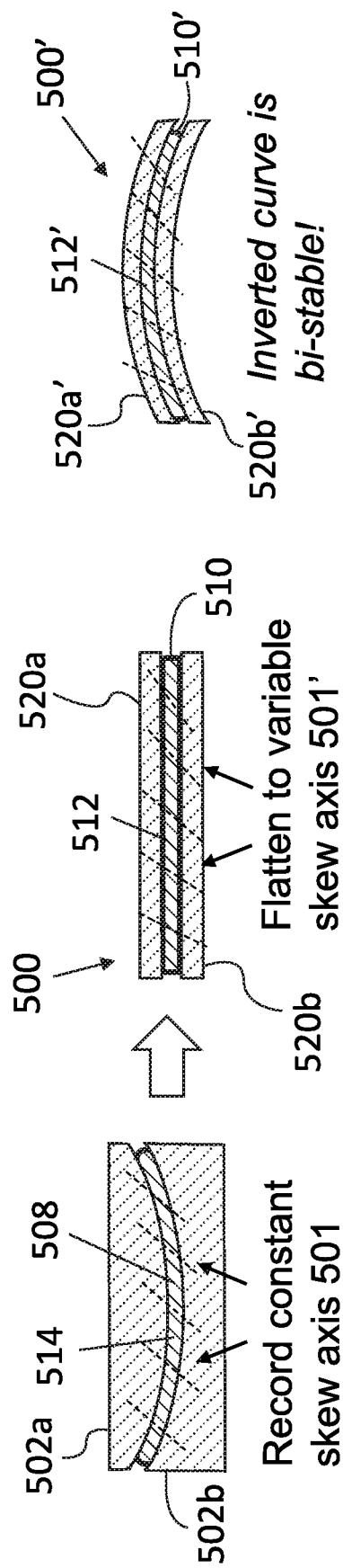

Image with camera in same plane as flat sample

150 μm refocus/translation of camera

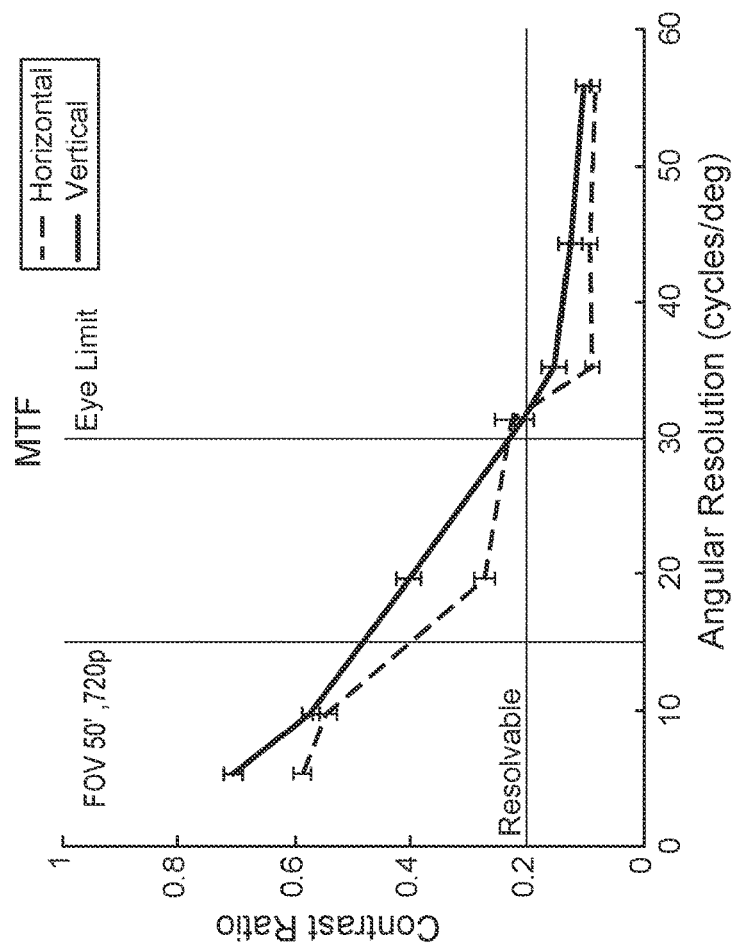
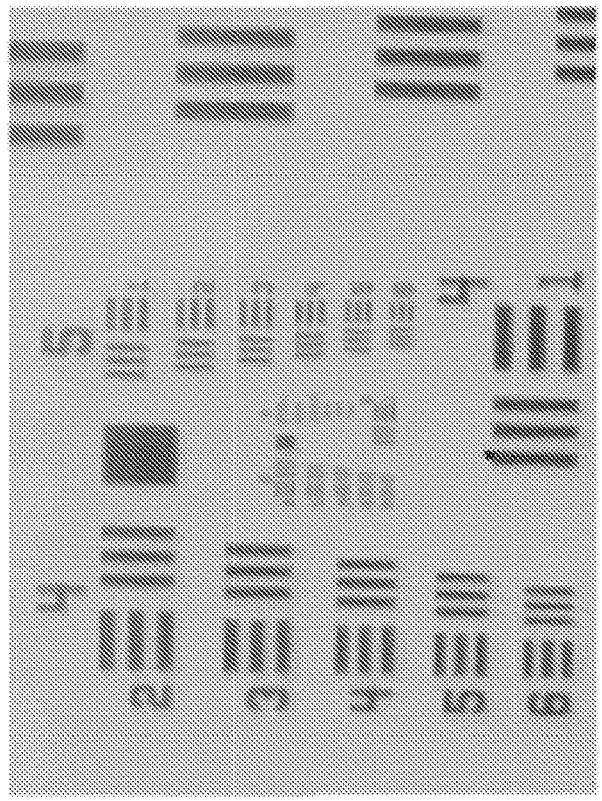
FIG. 13B
FIG. 13A

SPATIALLY VARYING SKEW MIRRORS

CROSS-REFERENCE TO RELATED APPLICATIONS

This application is a 35 U.S.C. 371 national stage application of International Application No. PCT/US2017/056404, filed Oct. 12, 2017, which is a continuation-in-part of International Application No. PCT/US2017/020087, filed Mar. 1, 2017, and which also claims the benefit of U.S. Provisional Application No. 62/407,398, filed Oct. 12, 2016, U.S. Provisional Application No. 62/407,994, filed Oct. 13, 2016, and U.S. Provisional Application No. 62/435,676, filed December, 2016, each of which is incorporated by reference herein in its entirety.

BACKGROUND

A holographic skew mirror is a holographic optical element that reflects incident light about a reflective axis that need not be perpendicular to the surface upon which the incident light impinges. In other words, a holographic skew mirror's reflective axis does not have to be parallel to or coincident with the surface normal of the holographic optical element. The angle between the reflective axis and the surface normal is referred to as the reflective axis angle and can be selected based on the desired application of the holographic skew mirror.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating or skew mirror is said to be structured to "reflect" incident light, a conventional artisan might prefer to say the grating structure is structured to "diffract" incident light, since grating structures are generally thought to act on light by diffraction. However, such use of the term "diffract" would result in expressions such as "incident light is diffracted about substantially uniform reflective axes," which could be confusing. Substantially uniform reflective axis or axes vary by less than 0.25 degrees.

Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

SUMMARY

Embodiments of the present technology include a holographic optical element comprising a grating structure residing in a grating medium. This grating structure is structured to reflect an incident collimated beam about spatially varying skew axes to form a reflected beam having a reflected wavefront characterized by a non-zero third-order or higher Zernike coefficient. These spatially varying skew axes forming non-zero angles with a surface normal of the surface of the grating medium in at least some spatial locations.

In some examples of this holographic optical element, the grating structure comprises first and second gratings disposed at a first location in the grating medium. The first grating is characterized by a first grating vector having a first length and pointing in a first direction. And the second grating is characterized by a second grating vector having a second length different than the first length and pointing in the first direction.

In other examples of this holographic optical element, the grating structure comprises a first distribution of gratings disposed at a first location in the grating medium and a second distribution of gratings disposed at a second location in the grating medium. The first distribution of gratings has a first distribution of spatial frequencies and is oriented in a first distribution of directions. And the second distribution of gratings has a second distribution of spatial frequencies different than the first distribution of spatial frequencies. The second distribution of gratings is oriented in a second distribution of directions, which is substantially the same as the first distribution of directions.

The spatially varying skew axes in the holographic optical element may have orientations that vary smoothly as a function of position within the grating medium. For instance, the variation may cause the grating structure is configured to focus the reflected beam to a virtual or real focal point, e.g., located 1 meter to 10 meters from the grating structure.

Other embodiments include a method of illuminating a grating structure residing in a grating medium with an incident collimated beam. In response to this illumination, the grating structure reflects the incident collimated beam about spatially varying reflective axes to form a reflected beam having a reflected wavefront characterized by a non-zero third-order or higher Zernike coefficient. Again, the spatially varying reflective axes forming non-zero angles with a surface normal of the surface of the grating medium. The reflected beam may focus to a virtual or real focal point.

Another embodiment includes a method of writing holographic gratings in a photosensitive medium. This method comprises spatially modulating a wavefront of a first beam and interfering the first beam with a second beam, which may be spatially modulated as well, in a photosensitive medium to create a first interference pattern having a first distribution of orientations and a first distribution of spatial frequencies. (Each orientation in the first distribution of orientations may correspond to a spatial frequency in the first distribution of spatial frequencies.) It also comprises spatially modulating a wavefront of a third beam and interfering the third beam with a fourth beam in the photosensitive medium to create a second interference pattern. The second interference pattern has a second distribution of spatial frequencies different from the first distribution of spatially frequencies and a second distribution of orientations matching the first distribution of orientations. The method also includes recording the first interference pattern and the second interference pattern as a spatially modulated index pattern of the photosensitive medium.

In some examples of this method, spatially modulating the wavefront of the first beam comprises determining a desired distribution of orientations for the first interference pattern. This desired distribution of orientations for the first interference pattern and the second beam can be used to calculate a desired wavefront for the first beam, which in turn can be used to calculate a control function for a spatial light modulator (SLM) based on the desired wavefront for the first beam. The SLM is modulated with the control function to spatially modulate the wavefront of the first beam. If desired, the first distribution of orientations can be measured, with the measurement used to determine an error in the wavefront of the first beam. This error can be used to adjust the control function for the SLM.

Yet another embodiment includes a holographic optical element comprising a grating structure that resides in a grating medium and includes comprises a plurality of gratings in the same distribution of orientations at different spatial frequencies.

Still another embodiment includes a method of writing holographic gratings in a photosensitive medium. This method comprises spatially modulating a wavefront of a first beam and interfering the first beam with a second beam in a photosensitive medium to create a first refractive index modulation pattern characterized by a first distribution of grating vectors having a first distribution of lengths and pointing in a first distribution of directions. It also comprises spatially modulating a wavefront of a third beam and interfering the third beam with a fourth beam in the photosensitive medium to create a second refractive index modulation pattern characterized by a second distribution of grating vectors having a second distribution of lengths different from the first distribution of lengths and pointing in the first distribution of directions.

Another embodiment includes a method of writing holographic gratings in a photosensitive medium as follows. First, the photosensitive medium is disposed between a first surface and a second surface. These surfaces may be curved with the same curvatures or may have different curvatures (e.g., one may be flat and the other curved). Object and reference beams are coupled into the photosensitive medium, which records interference between the object and reference beams as a holographic grating. The photosensitive medium is released from the first surface and the second surface and warped so as to impart a spatially varying distortion to the holographic grating.

A further embodiment includes disposing a grating medium containing a grating structure in optical communication with a human eye. This grating medium having a proximate surface defining a surface normal. Visible light from a display is coupled into the grating medium and guided to the grating structure, which reflects the visible light to form a virtual image of the display at distance of 1 meters to 10 meters (e.g., 2 meters to 4 meters) from the human eye. Guiding the visible light to the grating structure may include totally internally reflecting the visible light.

A yet further embodiment includes an optical reflecting device with a grating medium and a grating structure occupying a volume within the grating medium. The grating structure is structured to reflect incident light having a first wavelength and a first range of incidence angles, and incident upon a surface of the grating medium at a first location about a substantially uniform first reflective axis. The grating structure is structured to reflect incident light having a second wavelength and a second range of incidence angles and incident upon the surface of the grating medium at a second location about a substantially uniform second reflective axis. The substantially uniform first reflective axis differs from the substantially uniform second reflective axis by at least 0.1 degrees. In some cases, the first wavelength differs from the second wavelength by at least 50 nm and the first range of incidence angles is the same as the second range of incidence angles. In some cases, the first range of incidence angles is at least 15 degrees. In some embodiments, reflective axes vary by less than 0.10 degree, or by less than 0.05 degree, or by less than 0.025 degree.

A still further embodiment includes an optical reflecting device comprising a grating medium and a grating structure occupying a volume within the grating medium. The grating structure is structured to reflect a wavelength of incident light having a first range of incidence angles, the first range of incidence angles being at least 15 degrees. This incident light is incident upon a surface of the grating medium at multiple locations. At each of the multiple locations, the incident light is reflected about a substantially uniform reflective axis. And the substantially uniform reflective axis at each of the multiple locations differs from the substantially uniform reflective axis of at least one other of the multiple locations by more than 0.1 degrees.

Yet another embodiment includes a holographic optical element made according to a process comprising interfering a first diverging spherical beam with a first converging spherical beam within a holographic recording medium to record a first holographic grating within the holographic recording medium, with the first diverging spherical beam and the first converging spherical beam being at a first wavelength and having conjugate wavefronts. This process may further comprises interfering a second diverging spherical beam with a second converging spherical beam within the holographic recording medium to form a second grating, with the second diverging spherical beam and the second converging spherical beam being at a second wavelength different than the first wavelength.

A still further embodiment includes an optical reflective device with a grating structure residing in a grating medium. The grating structure is structured to principally reflect incident light as reflected light. The incident light and the reflected light form a first angle bisected by a first reflective axis at a first location of the grating medium and a second angle bisected by a second reflective axis at a second location of the grating medium. Each of the first reflective axis and the second reflective axis are substantially uniform where the incident light has a range of angles of incidence of at least 15 degrees. The first reflective axis differs from a surface normal of the grating medium by at least 2.0 degrees. And the second reflective axis differs from the first reflective axis by at least 0.1 degrees. In some cases, the first reflective axis differs from the surface normal of the grating medium by at least 4.0 degrees.

An embodiment includes an optical reflective device with a grating structure residing in a grating medium. The grating structure is structured to principally reflect incident light as reflected light. The incident light and the reflected light form a first angle bisected by a reflective axis. The reflective axis forms a second angle with a surface normal of the grating medium. The second angle varies as a function of position within the grating medium, and at any one position within the grating medium the reflective axis varies by less than 0.10 degree where the incident light has a range of angles of incidence of at least 15 degrees.

Another embodiment includes illuminating a grating structure residing in a grating medium with incident light at a first wavelength. The incident light reflects off the grating structure to produce reflected light at the first wavelength and a first range of incidence angles of at least 15 degrees. Together, the incident light and the reflected light form, at a first location within the grating medium, a first angle bisected by a first reflective axis tilted with respect to a surface normal of the grating medium and, at a second location within the grating medium, a second angle bisected by a second reflective axis different from the first reflective axis. And the first reflective axis is substantially uniform and the second reflective axis is substantially uniform. In a variation, the second reflective axis differs from the first reflective axis by at least 1.0 degree.

Still another embodiment includes a device, such as a head-mounted display, comprising a holographic optical element having at least one grating structured to reflect visible light about a first axis of reflection that forms a first angle of 15° to 45° with respect to a surface normal of the holographic optical element and about a second axis of reflection that forms a second angle, different from the first angle, of 15° to 45° with respect to the surface normal of the holographic optical element. In operation, illuminating at least one grating in this holographic optical element with visible light causes the illuminated grating(s) to reflect a first portion of the light about a first axis of reflection that forms a first angle of 15° to 45° with respect to a surface normal of the holographic optical element and a second portion of the light about a second axis of reflection that forms a second angle, different from the first angle, of 15° to 45° with respect to the surface normal of the holographic optical element.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a perspective view of a conventional holographic skew mirror.

FIG. 1B shows a perspective view of a spatially varying skew mirror.

FIG. 3E illustrates a process for recording a spatially varying skew mirror.

FIG. 3F illustrates a metrology process for recording a spatially varying skew mirror.

FIG. 5A shows holographic recording medium sandwiched between a curved conformal casting substrates and recording interference patterns between planar wavefronts to form a holographic grating medium.

FIG. 5B shows the holographic grating medium of FIG. 5A with spatially varying skew axes caused by sandwiching the holographic grating medium between a pair of flat substrates.

FIG. 5C shows the holographic grating medium of FIG. 5A with spatially varying skew axes caused by sandwiching the holographic grating medium between a pair of curved substrates with curvature opposite that of the curved conformal casting substrates.

FIG. 13A shows another image of a resolution test chart reflected from a spatially varying optical skew mirror with 0.66 Diopters of optical power.

FIG. 13B is a plot of contrast ratio versus angular resolution for a spatially varying optical skew mirror with 0.66 Diopters of optical power as measured with the metrology platform of FIG. 10.

DETAILED DESCRIPTION

1 Spatially Varying Skew Mirrors

Figure 1D:
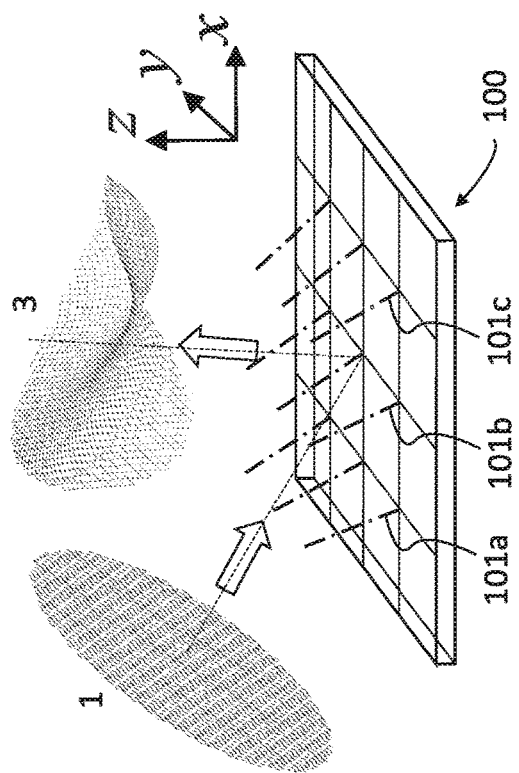
FIG. 1D shows a perspective view of a spatially varying skew mirror reflecting a collimated beam to produce a beam with a curved wavefront.

In a holographic skew mirror, incident light is reflected about a reflective axis that can be tilted with respect to the surface upon which it impinges. In a spatially varying skew mirror, also called a spatially varying holographic skew mirror or spatially varying optical skew mirror, the angle between the reflective axis and the surface (or equivalently the surface normal) can vary as a function of position on the surface. Put differently, a spatially varying skew mirror can have many reflective axes, each of which forms a different angle with the surface normal. Depending on how these reflective axes are oriented, a spatially varying skew mirror can focus incident light, much like a curved mirror, but about an axis that is tilted with respect to the surface normal. Spatially varying skew mirrors and other holographic optical elements with spatially varying holographic skew axes can be used to change the focal plane in a waveguided output coupler, to increase the field-of-view for head-mounted displays (e.g., for augmented, mixed, or virtual reality), to add focusing power for head-mounted displays (e.g., to provide the wearer's ophthalmic prescription), to couple light into and out of waveguides (e.g., as in an input coupler or vergence coupler), or to display images at or closer than infinity (e.g., as in a pancake window display).

FIGS. 1A and 1B show a conventional holographic skew mirror 10 and a spatially varying skew mirror 100, respectively. The conventional holographic skew mirror 10 has reflective axes 11 that are parallel with each other throughout; that is, each reflective axis 11 forms the same angle with the surface normal (z axis) and the same azimuthal angle (angle with respect to the x-y plane), no matter what its lateral (x, y) position. As a result, the conventional holographic skew mirror 10 reflects a collimated incident beam (not shown) as a collimated reflected beam. For more on conventional holographic skew mirrors, see International Application No. PCT/US2016/048499, entitled "Skew Mirrors, Methods of Use, and Methods of Manufacture," and International Application No. PCT/US2017/020087, entitled "Wide Field-of-View Holographic Skew Mirrors," each of which is incorporated by reference herein in its entirety.

Conversely, the spatially varying skew mirror 100 has reflective axes 101a-101i (collectively, reflective axes 101) that form different angles with the surface normal (z axis). These angles vary as a function of lateral (x, y) position. In this example, the angle between the surface normal and reflective axis 101a is smaller than the angle between the surface normal and reflective axis 101i. Put differently, the reflective axes 101 in the spatially varying skew mirror 101 are not parallel to each other.

The angles between the surface normal and reflective axes and the reflective axes' azimuthal angles may vary smoothly as function of lateral (x or y) position. In other words, plotting the angle between the surface normal and reflective axes as a function of the (x, y) coordinates may yield a smoothly varying function, with reflective properties approximating, for example, a conventional curved mirror with a spherical, cylindrical, parabolic, or freeform surface. Because the reflective axes form different angles with the surface normal, a beam reflected by a spatially varying skew mirror 100 may have a different wavefront curvature than the incident beam.

For a focusing or defocusing spatially varying skew mirror, the amount of skew axis variation to change focal planes is small, but non-negligible. Generally, the radius of curvature for a focusing mirror is about twice the desired focal distance. For a 50 mm spatially varying skew mirror with a 10 m focal distance, the angular variation in skew axis angle is 0.5×(180 degrees/π)×(0.05 m/10 m)=0.14 degrees. For a 50 mm spatially varying skew mirror with a 1 m focal distance, the angular variation in skew axis angle is 0.5×(180 degrees/π)×(0.05 m/1 m)=1.43 degrees. Typically, the skew axis angular variation for changing focal planes may be 0.1 degrees or more (e.g., 0.1 degrees, 0.2 degrees, 0.3 degrees, 0.4 degrees, 0.5 degrees, 0.6 degrees, 0.7 degrees, 0.8 degrees, 0.9 degrees, 1.0 degrees, 1.1 degrees, 1.2 degrees, 1.3 degrees, 1.4 degrees, 1.5 degrees, 1.75 degrees, 2.0 degrees, 2.25 degrees, 2.5 degrees, 2.75 degrees, 3.0 degrees, and any other value within this range). For other applications, the angular variation can be higher (e.g., about 28.6 degrees for the wide field-of-view head-mounted display of FIG. 8).

1.1 Zernike Coefficients

Like other optical components, a spatially varying skew mirror, or spatially varying skew mirror (SVSM), can be characterized by how it alters the wavefront of an incident beam of light. As understood by those of ordinary skill in the art and described in greater detail below, wavefront are often described by Zernike polynomials. The coefficients of the Zernike polynomials represent the wavefront's properties, including the amount of piston, tilt, focus, astigmatism, coma, and spherical aberration. The third-order coefficient represents the wavefront's focus as shown in TABLE 1 (below), which lists several of the Zernike polynomials, Zernike coefficients, and aberrations:

TABLE 1

Zernike Radial Polynomials

| n | m | Coefficient No. | Polynomial | Aberration |
|---|---|---|---|---|
| 0 | 0 | 0 | 1 | Piston |
| 1 | 1 | 1 | $\rho\cos\vartheta$ | X-Tilt |
|   |   | 2 | $\rho\sin\vartheta$ | Y-Tilt |
| 2 | 0 | 3 | $2\rho^2 - 1$ | Focus |
|   | 2 | 4 | $\rho^2\cos2\vartheta$ | Astigmatism @ 0° & Focus |
|   |   | 5 | $\rho^2\sin2\vartheta$ | Astigmatism @ 45° & Focus |
|   | 1 | 6 | $(3\rho^2 - 2)\rho\cos\vartheta$ | Coma & X-Tilt |
|   |   | 7 | $(3\rho^2 - 2)\rho\sin\vartheta$ | Coma & Y-Tilt |
|   | 0 | 8 | $6\rho^4 - 6\rho^2 + 1$ | Spherical & Focus |

Illuminating a spatially varying skew mirror with an incident beam produces a reflected beam whose third-order (focus) Zernike coefficient is different than that of the incident beam. Consider, for example, illuminating a spatially varying skew mirror with a perfectly collimated beam, which may have non-zero piston and tilt, but has no focus, astigmatism, coma, or spherical aberration (i.e., the third- and higher-order Zernike coefficients are zero). The spatially varying skew mirror introduces a change in the non-zero third- or higher-order Zernike coefficient, causing the reflected beam to have at least one non-zero third- or higher-order Zernike coefficient. In other words, the spatially varying skew mirror changes the curvature of the incident beam's wavefront. This occurs whether or not the spatially varying skew mirror is physically flat (e.g., as in FIG. 1B) or physically curved.

Figure 1C:
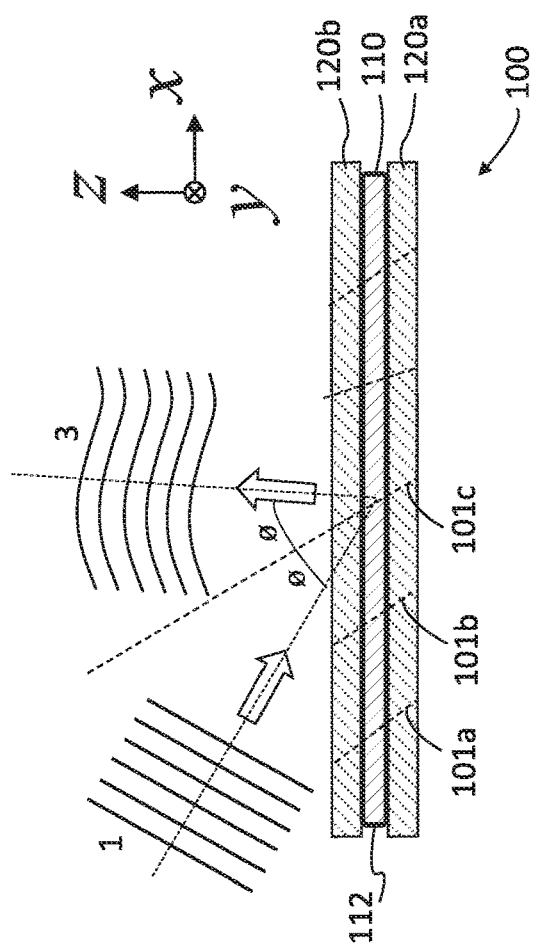
FIG. 1C shows a side view of a spatially varying skew mirror reflecting a collimated beam to produce a beam with a curved wavefront.

FIGS. 1C and 1D show side and perspective views of the spatially varying skew mirror 100 of FIG. 1 reflecting an incident collimated beam (plane wave) 1. The collimated beam 1 illuminates a section of the spatially varying skew mirror 100 with skew axes 101a-101c. It reflects about skew axis 101c to form a reflected beam 3 with a curved wavefront that propagates away from the spatially varying skew mirror 100. The propagation directions, or wave vectors, of the incident collimated beam 1 and reflected beam 3 are symmetric about skew axis 101g.

FIG. 1C also shows components of the spatially varying skew mirror 100, including a holographic grating medium 110, which, for display applications, may have a thickness of about 0.5 mm to about 1.0 mm, depending on the desired resolution. For other applications, the thickness could be different, with thicker holographic recording media yielding higher potential spatial resolution.

A holographic grating structure 112 that defines the skew axes 101 resides in the holographic grating medium 110. It can be programmed in the holographic grating medium 110 using the recording techniques disclosed below. The holographic grating medium 110 is sandwiched between a pair of substrates 120a and 120b, which may be made of glass (e.g., Corning Eagle XG glass at 0.5 mm or 0.3 mm thick), plastic, or any other suitable material. The upper substrate 120b is transparent at the wavelength of the incident collimated beam 1. The lower substrate 120a may be transparent, opaque, or reflective at the wavelength of the incident collimated beam 1. If desired, the lower substrate 120a and/or upper substrate 120b may be coated with a scratch or anti-reflective coating, e.g., as in an ophthalmic lens.

1.2 Skew Mirror with Optical Power

Figure 2B:
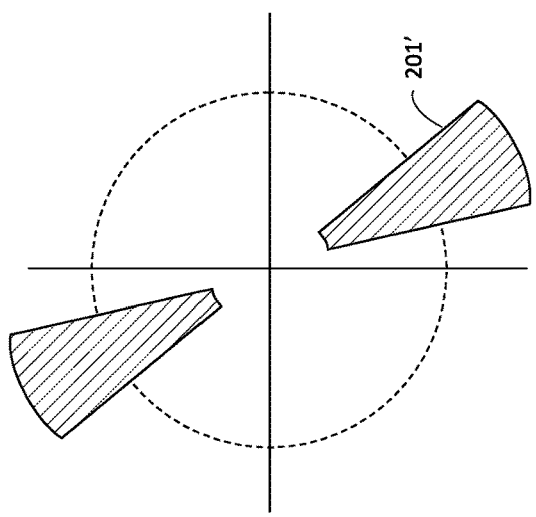
FIG. 2B shows a k-space diagram representing the ensemble of holographic gratings that form the holographic grating structure in the spatially varying skew mirror of FIG. 2A.
Figure 2A:
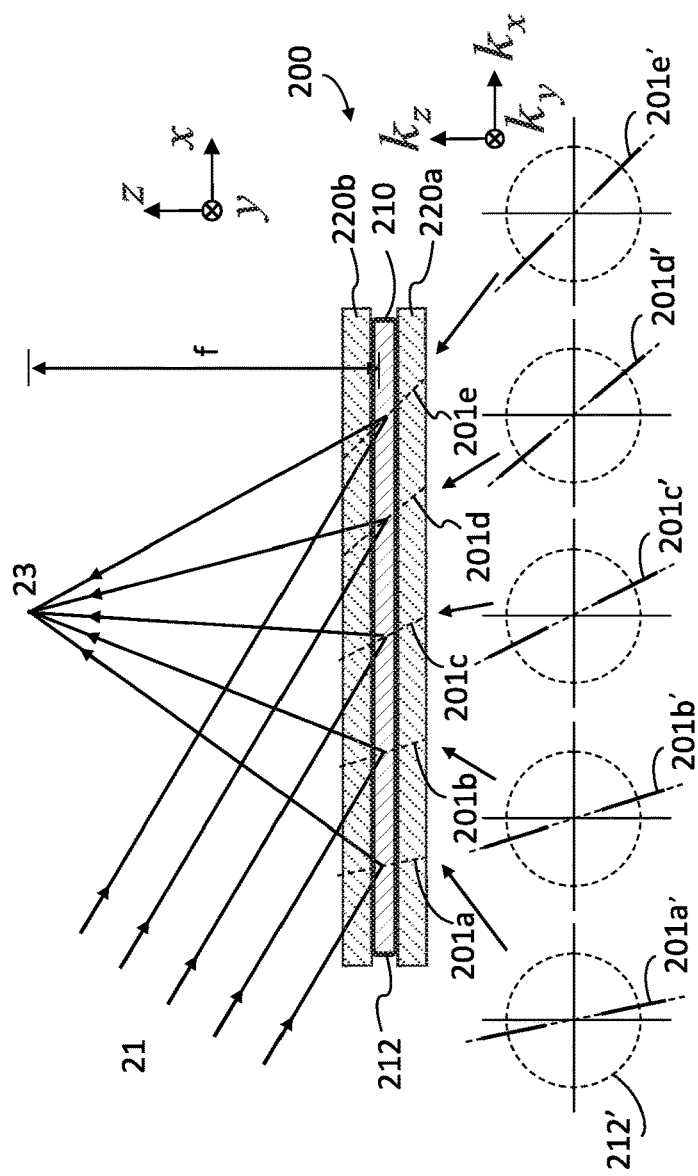
FIG. 2A shows a side view (top) of a spatially varying skew mirror with k-space diagrams (bottom) focusing a collimated incident beam to a point.

FIGS. 2A and 2B illustrate a spatially varying skew mirror 200 with optical power. The skew mirror 200 may be achromatic over specific wavelengths (e.g., wavelengths emitted by red, green, and blue LEDs) and angles (e.g., the field of view of a head-mounted display). Wavelength and angle selectivity are coupled, so the skew mirror can be wavelength-selective in some cases, but not for any arbitrary wavelength/angle combination.

The skew mirror 200 includes a holographic grating medium 210 disposed between a pair of substrates 220a and 220b (collectively, substrates 220). The holographic grating medium 210 hosts a holographic grating structure 212 that defines skew axes 201a-201e (collectively, skew axes 201) whose orientations with respect to the surface normal of the substrates 220 vary with lateral (x, y) position. The holographic grating structure 212 includes many holographic gratings, or holograms, oriented in the same direction at one point in space, but that direction varies in space.

FIG. 2A also shows the spatial frequency, or k-space, distributions 201a'-201e' (collectively, k-space distributions 201') of the holographic gratings that define the skew axes. The dashed circle 212' is a two-dimensional section of a construct called the "k-sphere," which has a radius of $k=2\pi n/\lambda$, where n is the average refractive index of the hologram (the bulk index of the holographic grating medium 210) and $\lambda$ is the vacuum wavelength of the light. (For simplicity, FIG. 2A shows the k-sphere 212' at only one wavelength.) The propagation vectors of the incident and reflected beams inside the holographic grating medium 210 extend from the origin to the surface of the k-sphere.

Each holographic grating in the grating structure 212 may be a volume phase hologram that comprises spatial variations of the refractive index within the holographic grating medium 210. If the volume phase hologram is sinusoidal, it can be represented as a dot in k-space. A distribution of sinusoidal volume phase holograms can be represented as a line segment, e.g., as in k-space distributions 201', whose orientations with respect to the $k_z$ axis depend on the holographic recording geometry. For a spatially varying skew mirror, the recording geometries are selected such these orientations are different in different (real-space) portions of the holographic grating medium.

For the spatially varying skew mirror 200 shown in FIG. 2A, the recording geometries are selected so that holographic volume gratings span a range of spatial frequencies (e.g., $1.0 \times 10^7$ rad/m through $4.7 \times 10^7$ rad/m) at each location, as shown in FIG. 2B. The holographic volume gratings are furthermore oriented so that skew axes are oriented differently at each location (k-space distributions 201a'-201e' reside along grating vectors at each location and thus illustrate skew axes), and reflective axes 201a-201e have the same spatial distribution as the skew axes. This causes the skew mirror 200 to act as a focusing mirror with a focal length f: as shown in FIG. 2A, it focuses an incident collimated beam 21 to a point located a distance f away from its upper surface. Each ray of the incident collimated beam 21 illuminates a different (x, y) portion or section of the skew mirror 200. Because the skew axes 201 associated with these different portions form different angles with the skew mirror's surface normal (z axis), the rays of the reflected beam 23 propagate away from the skew mirror 200 at different angles to converge at a focal point.

The skew mirror's focal length f depends primarily on the orientations of the skew axes 200, which in turn are set by the recording geometry used to write the volume phase holograms in the holographic grating structure 212. The focal length can be positive, as shown in FIG. 2A, or negative. Suitable focal lengths range from about 10 mm to infinity (e.g., 1 cm, 5 cm, 10 cm, 50 cm, 1 m, 2 m, 4 m, 5 m, 10 m, or other value from about 10 mm to infinity).

Because the skew axes' orientations can vary throughout the holographic grating medium 210, different portions of the spatially varying skew mirror 210 can have different focal lengths. Put differently, the spatially varying skew mirror 210 can act as an array or set of focusing mirrors. These focusing mirrors can have identical or different focal lengths, shapes, and sizes. They can be distributed regularly (e.g., in a one- or two-dimensional periodic array) or irregularly.

2 Methods of Making Spatially Varying Skew Mirrors

Like a conventional holographic skew mirror, a spatially varying skew mirror can be made by recording the many interference patterns between two or more coherent beams in a holographic recording medium, such as the AK174-200 or AK233-200 photosensitive polymeric optical recording media available from Akonia Holographics, LLC, BAYFOL® HX TP photopolymer film available from Covestro AG, photorefractive crystals, dichromated gelatin, photothermo-refractive glass, and film containing dispersed silver halide particles. The recording process transforms a holographic recording medium into a holographic grating medium with a holographic grating structure that contains tens, hundreds, or even thousands of holographic gratings.

In a conventional holographic skew mirror, the wavefronts of the beams interfering in the holographic recording medium are flat, i.e., they have no curvature, and produce a constant skew axis across the holographic recording medium. Thus, the reflected mode from a conventional holographic skew mirror is a plane wave when the incident wave is a plane wave. In a spatially varying skew mirror, the wavefront of one or both recording beams is programmed with a non-flat wavefront and is recorded in the same manner as a conventional skew mirror. For instance, one or both of the recording beams may have Zernike focus terms whose magnitudes are similar to the focal length of the spatially varying skew mirror. They may have higher-order Zernike terms as well.

In some examples, the interfering beams may have spherical wavefronts. Interfering a diverging spherical beam with a conjugate converging spherical beam may produce an interference pattern for a spatially varying skew mirror. Because each spherical wavefront can be considered to have a distribution of wave vectors, the resulting grating structure can be considered to have distribution of grating vectors. Such a grating structure can be decomposed into sinusoidal gratings spanning a range or distribution of orientations over a given set of spatial locations. Changing the wavelengths of the conjugate diverging and converging spherical beams changes the gratings' spatial frequencies. Thus, tuning the spherical beams' wavelengths, e.g., using a tunable laser during the recording process yields a grating structure that can be decomposed into sinusoidal gratings, with gratings at different locations having different (grating vector) orientations and gratings in the same location having different spatial frequencies. In the case where the converging and diverging beams have the same center of curvature, the grating vectors written will have the same orientation as the writing beam wave vectors regardless of the writing wavelength. Thus, changing wavelength while maintaining the center of curvature allows multiple holograms to be written, forming a spatially varying skew mirror.

Alternatively, the holographic recording medium is warped after recording an interference pattern formed by either flat or curved wavefronts to produce spatial variations in the skew axis orientation. This process of warping the holographic recording medium is called conformal casting and may be applied for increasing the field of view (FoV) in a reflective head mounted display (HMD).

2.1 Optically Programming a Spatially Varying Skew Axis

Figure 3B:
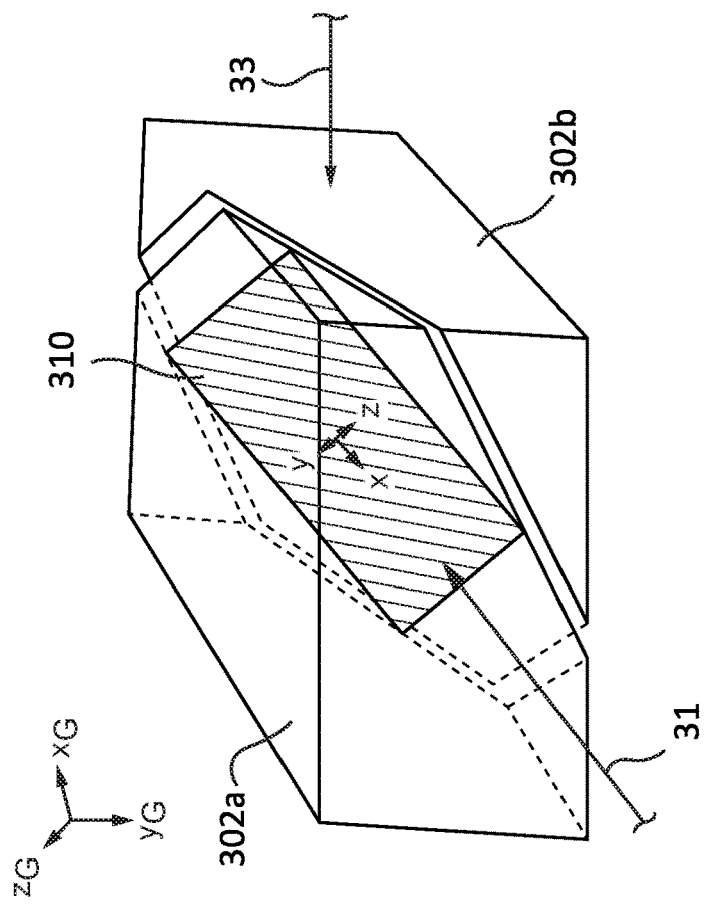
FIG. 3B illustrates a perspective view of the holographic recording medium and prism package of FIG. 3A.
Figure 3A:
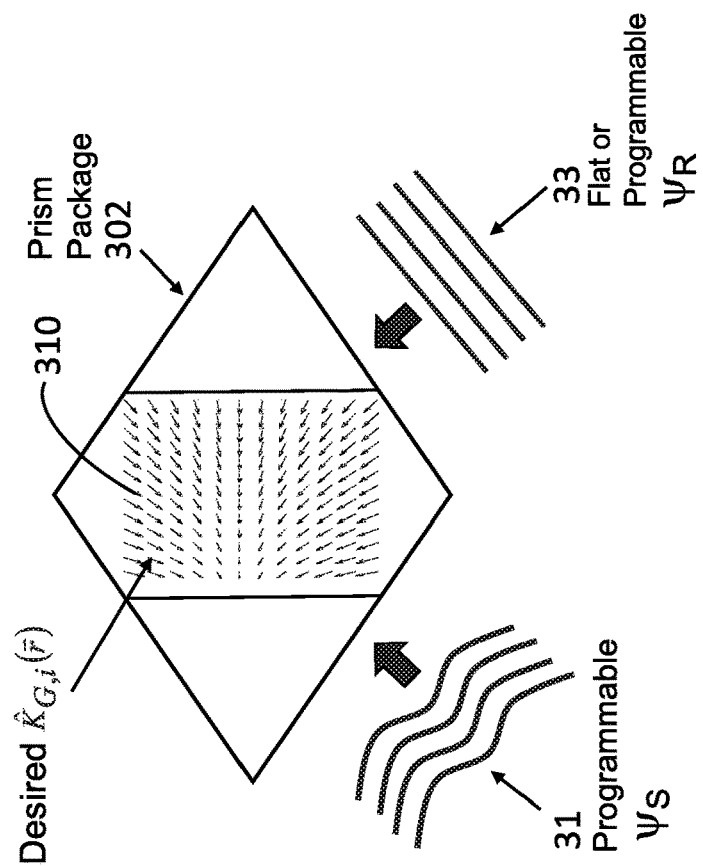
FIG. 3A illustrates programming a skew axis in a holographic recording medium held in a prism package by interfering a programmable writing beam with a collimated or programmable writing beam.
Figure 3C:
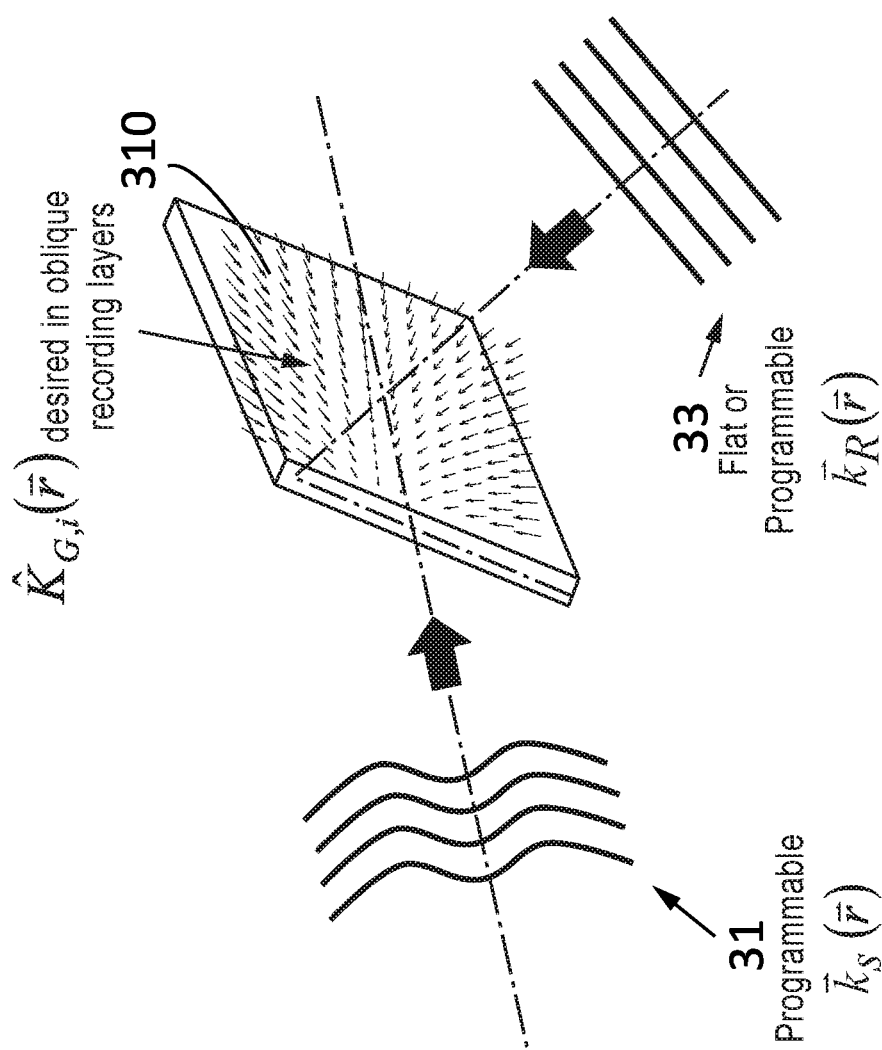
FIG. 3C shows an oblique view of programming a skew axis into a holographic recording medium by interfering a programmable writing beam with a collimated or programmable writing beam.

FIGS. 3A, 3B, and 3C illustrate optically programming a spatially varying skew axis in a holographic recording medium 308. The holographic recording medium 308 may be sandwiched between a pair of transparent substrates (not shown), which are held in place by with prisms 302a and 302b (collectively, prisms 302) like those disclosed in International Application No. PCT/US2016/048499, entitled "Skew Mirrors, Methods of Use, and Methods of Manufacture," and International Application No. PCT/US2017/020087, entitled "Wide Field-of-View Holographic Skew Mirrors," each of which is incorporated by reference herein in its entirety.

The holographic recording medium 310 records the interference between a first beam 31 whose wavefront is programmed, e.g., using a spatial light modulator (SLM), and a second beam 33 whose wavefront can be programmed but does not have to be programmed The holographic recording medium 308 records the interference as a volume phase hologram whose spatially varying grating vector is determined by the difference in the first and second beams' wave vectors, i.e., $\vec{K}_G(\vec{r}) = \vec{k}_S(\vec{r}) - \vec{k}_R(\vec{r})$. The first beam's wave vectors are locally perpendicular to the first beam's wavefront, and the second beam's wave vectors are locally perpendicular to the second beam's wavefront.

Once the first holographic grating has been recorded, the first beam, the second beam, or both beams are adjusted. The adjusted beams, sometimes called third and fourth beams, interfere within the holographic recording medium 308, which records the interference as a second holographic grating. The second holographic grating's spatially varying grating vector is given by the difference between the third and fourth beams' wave vectors, which are chosen such that the second holographic grating's grating vector is aligned with first holographic grating's grating vector as shown in FIG. 3A.

This process of adjusting the beams and recording the resulting interference patterns in the holographic recording medium 308 transforms the holographic recording medium 308 into a holographic grating medium with a holographic grating structure. The holographic grating structure is composed of tens to thousands of holographic gratings, each of which has a grating vector aligned with a skew axis function, ϕ(x, y), where ϕ(x, y) is a two-element vector function specifying the x and y components of the skew axis angle with respect to surface normal as a function of x, y spatial location. Put differently, in order to fabricate a skew mirror with a skew axis function ϕ(x, y), the grating vector distributions $\vec{K}_{G,i}(\vec{r})$ of the holographic gratings i=1, . . . , n are made parallel in the chosen x-y plane to $\hat{K}_G(x, y)$, which is the unit vector aligned with ϕ(x, y) within the same plane, by controlling the first beam's wave vector $\vec{k}_{S,i}(\vec{r})$ and, optionally, the second beam's wave vector $\vec{k}_{R,i}(\vec{r})$.

Let $\vec{r}$ be defined so that the z=0 plane bisects the skew mirror recording layer (holographic recording medium 308). In some embodiments, one set of recording beams, such as the $\vec{k}_{R,i}(\vec{r})$ beams, remain collimated and the $\vec{k}_{S,i}(\vec{r})$ wavefronts are programmed In these embodiments, the $\vec{k}_{R,i}(x, y)$ in the plane may be determined according to methods for recording an ordinary flat skew mirror, and the $\vec{k}_{S,i}(x, y)$ in the plane may be given by $$\vec{k}_{S,i}(x,y) = \vec{K}_{G,i}(x,y) + \vec{k}_{R,i}(x,y) = 2k_n \cos\theta_i(x,y) \hat{K}_G(x,y) + \vec{k}_{R,i}(x,y), \quad (1)$$

where $k_n = 2\pi n/\lambda$ is the wave number of the first beam 31 and second beam 33 within the holographic recording medium 308 and $\theta_i(x, y)$ is the spatially-varying difference angle between $\hat{K}_G(x, y)$ and $\vec{k}_{R,i}(x, y)$. In other words, $\vec{k}_{S,i}(x, y)$ at each location is a wave vector of length $k_n$ that writes a Bragg-matched grating vector with $\vec{k}_{R,i}(x, y)$ aligned with $\hat{K}_G(x, y)$.

Equation (1) gives one method for recording a spatially-aligned grating vector distribution, $\vec{K}_{G,i}(x, y)$, but those skilled in the art of holography will recognize that other methods are possible within the scope of the invention. In embodiments where $\vec{k}_{R,i}(\vec{r})$ is also programmable, the designer is allowed an additional degree of freedom that may be used to satisfy other constraints, as there are typically a plurality of wave vector combinations that satisfy the $\hat{K}_G(x, y)$ constraint. In some of these embodiments, the $\vec{k}_{R,i}(x, y)$, $\vec{k}_{S,i}(x, y)$ combination may be selected to produce uniform $\Delta K_G$ spacing among the holograms in the spatially varying skew mirror's holographic grating structure. In other embodiments, the $\hat{K}_G(x, y)$ constraint may be satisfied in a plane or two-dimensional (2D) surface that differs from the plane that bisects the recording layer.

As is known to those skilled in the art of holography, the complex amplitude of a beam $E_B(\vec{r})$ may be modulated in a 2D plane by a spatial modulation means, such as an SLM, a mask, or a deformable mirror. The complex value of $E_B(\vec{r})$ in other spatial locations may then be determined by the diffraction integral. Thus, a desired distribution of $E_B(\vec{r})$ in a desired plane or other 2D locus may be created by using an SLM or other spatial modulation means to create a precursor distribution in an upstream 2D locus. The precursor distribution is modulated to produce the desired distribution in the desired location upon application of the diffraction integral. The diffraction integral may be evaluated analytically or numerically in a digital computer using a beam propagation routine or other suitable technique. The spatial distribution of the complex amplitude $E_B(\vec{r})$ uniquely determines the spatial distribution of the wave vector, $\vec{k}_B(\vec{r})$. Thus, a system designer may generally specify a $\vec{k}_B(\vec{r})$ distribution within a single plane or 2D locus, but the values of $\vec{k}_B(\vec{r})$ in other spatial locations may be determined by diffraction.

Accordingly, it is generally possible to enforce the $\hat{K}_G(x, y)$ alignment constraint in a single plane or 2D controlled locus, but not throughout a volumetric region. $\hat{K}_G(\vec{r})$ may deviate from the desired value slowly in proportion to the distance from the 2D controlled locus when using recording beams of relatively low numerical aperture (NA). Thus, it may be advantageous to select a 2D controlled locus that reduces or minimizes the average or integrated volumetric distance from the locus within the final volumetric recording. Hence, the advantageous use of the plane that bisects the recording layer as the 2D controlled locus.

Figure 3D:
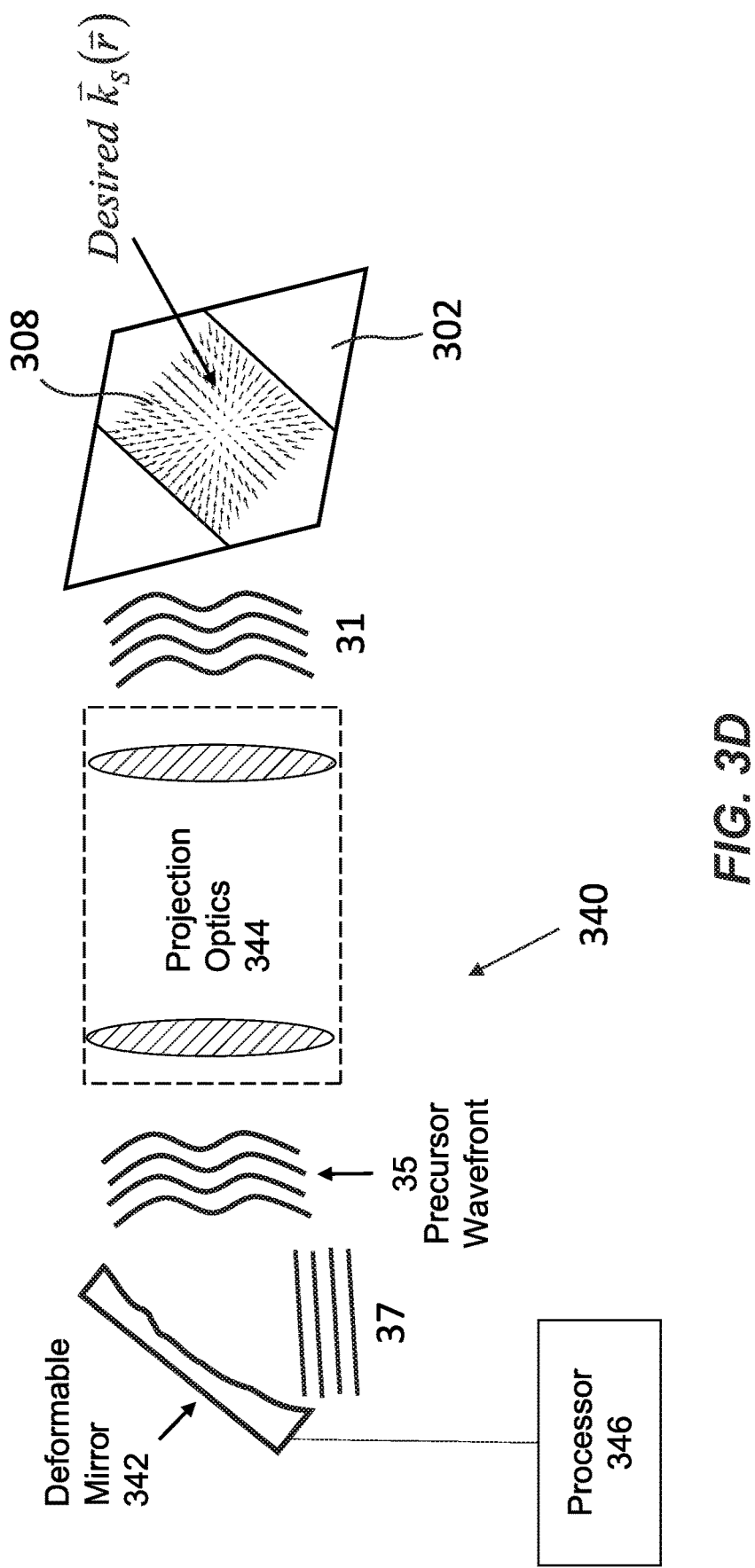
FIG. 3D shows a wavefront compensator for programming a programmable writing beam.

FIGS. 3C-3E illustrate control of $\vec{K}_G(x, y)$ within the plane bisecting the recording layer, which may be oblique to the optical axes of both recording beams. FIG. 3C shows the (programmable) first beam 31 interfering with the second beam 33 within the holographic recording medium 308 to produce a spatially-aligned grating vector distribution in an oblique plane. FIG. 3D shows a system 340 that can be used to spatially program or modulate the first beam 31. And FIG. 3E illustrates a process 360 for spatially programming or modulating the first beam 31 with the system 340 of FIG. 3D.

The system 340 of FIG. 3D includes dynamic spatial modulation means—here, a deformable mirror 342—that is controlled by a processor 346 and in optical communication with the holographic recording medium 308 via projection optics (e.g., one or more lenses and/or other optical elements) 344. In operation, the deformable mirror 342 adjusts the wavefront of a plane wave 37 to create a precursor wavefront 35. (In other embodiments, a nematic liquid crystal device, a static or moving phase plate, lenses, mirrors or any combination of those components/devices can be used to vary the wavefront of the plane wave 37, either statically or dynamically.) The precursor wavefront 35 propagates through projection optics 344 and the prism 302 holding the holographic recording medium 308; as it propagates, the precursor wavefront 35 evolves into the wavefront that interferes to produce the hologram recorded by the holographic recording medium 308. Because the deformable mirror 342 is a dynamic spatial light modulator, it can be controlled with the processor 346 to alter the precursor wavefront (and hence the wavefront of the first beam 31) from hologram to hologram, if desired.

Ideally, simply programming the deformable mirror 342 to produce a precursor wavefront 35 that produces a desired skew axis function, $\phi(x, y)$ should yield a perfect hologram. In practice, however, imperfections in alignment and in the optical components and insufficient accuracy of the parameters used to produce the recording wavefronts may result in imperfect holograms. These real-world imperfections may result from wavefront errors or aberrations, optical component misalignments, contrast reduction due to vibration or finite laser linewidth, or shadows cast by dust or other contaminants. These poor holograms may degrade the quality of the finished spatially varying skew mirror.

FIG. 3E shows a process 360 for correcting the recording wavefronts and FIG. 3F shows a process 380 for performing metrology on the finished article. The metrology measurements may be used to program the precursor wavefront 35 to reduce, avoid, or eliminate imperfections in the recorded holograms. In step 362 of process 360, the desired $\hat{K}_G(x, y)$ distribution for all holograms is determined from the design requirements. In step 364, one recording beam wave vector $\vec{k}_{R,i}(x, y)$ for the ith hologram is selected. The corresponding recording beam may be considered the first reference plane wave that would have been used to record the ith hologram in the equivalent flat skew mirror.

A processor uses the desired distribution and selected wave to calculate the wave vector distribution for the other recording beam, $\vec{k}_{S,i}(x, y)$ according to equation (1) in step 366. In step 368, the processor uses the wave vector distribution of the other recording beam to calculate the precursor wavefront by performing a reverse beam propagation, ray tracing, or any other suitable optical propagation simulation technique from the oblique controlled plane to the precursor location modulated with the SLM (deformable mirror). For example, the processor may perform an ordinary beam propagation by applying a single diffraction transfer function characterizing the diffraction between two planes transverse to an optical axis. For an oblique starting or ending plane, a different diffraction transfer function may be used to map each combination of points (or rows, or columns) from the oblique plane to the precursor location. Ray tracing or alternative means of optical propagation may alternatively be employed, for example, to trace the path through projection optics or other elements. In step 370, the SLM is modulated with a control function tailored to produce the precursor wavefront calculated in step 368. The holographic recording medium is exposed to interference between the recording beams in step 372, and the process 360 proceeds to the next iteration (i.e., the (i+1)th hologram) until the last hologram has been written.

Once the exposures are complete, the holograms are fixed under an incoherent light treatment. In most holographic recording media, left-over photochemicals are consumed with a very uniform light treatment. The resulting holographic grating media is typically unreactive to random light and write noise. A typical holographic recording medium has a long asymptotic tail where it is still just slightly sensitive to light, but not sensitive enough to be useful for writing holograms.

A spatially varying skew mirror (SVSM) made using process 360 can be tested using the process 380 shown in FIG. 3F. In step 382, a metrology system (e.g., as disclosed below) measures the actual grating distribution for each hologram in the SVSM. A processor determines deviations or errors in the actual grating distributions versus the desired grating distributions in step 384. This information is fed back to the SVSM production process 360, e.g., when calculating the precursor wavefront, to reduce errors in subsequently manufactured SVSMs.

2.2 Making a Spatially Varying Skew Mirror

Figure 4A:
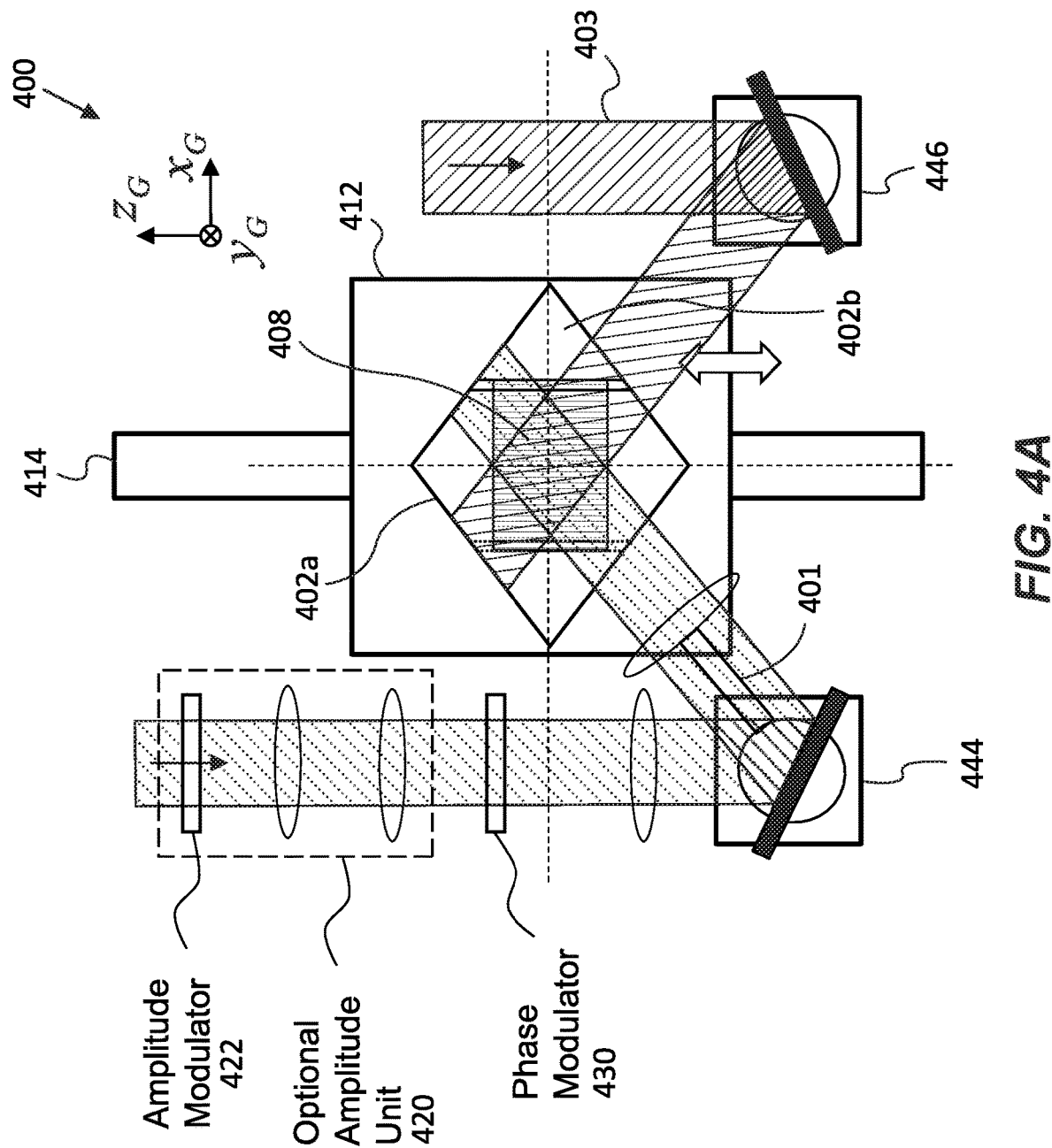
FIG. 4A is a plan view of a system for writing a spatially varying skew mirror with a phase- and amplitude-programmable writing beam and a collimated writing beam.
Figure 4B:
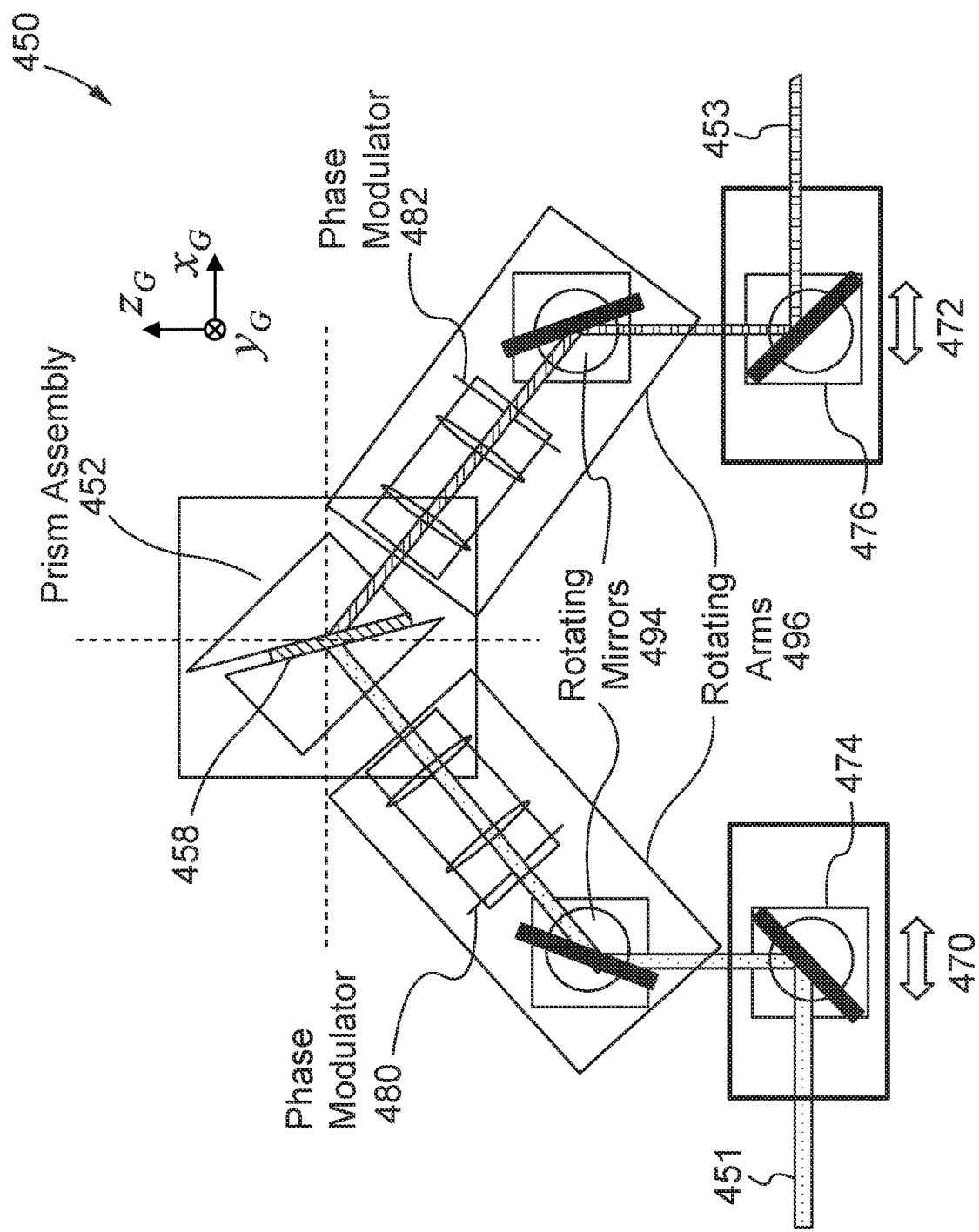
FIG. 4B is a plan view of a system for writing a spatially varying skew mirror with a pair of phase-modulated writing beams.

FIGS. 4A and 4B illustrate systems 400 and 450, respectively, for making spatially varying skew mirrors. The system 400 of FIG. 4A provides dynamic phase and amplitude control of the wavefront of a single writing beam, and the system 450 provides phase control of both writing beams. Those of ordinary skill in the art of holography will appreciate that the components and operating principles of the systems can be applied selectively to other systems as well.

The system 400 in FIG. 4A includes a holographic recording medium 408 sandwiched between a pair of prisms 402a and 402b (collectively, prisms 402). The holographic recording medium 408 and prisms 402 are mounted on a motorized translation stage 412 that can move along a rail 414 aligned with the $z_G$ axis. The system 400 includes one or more lenses, a dynamic phase modulator 430, an optional amplitude modulation unit 420 with a dynamic amplitude modulator 422, and a first rotating mirror 444 in the path of a first beam 401. A second rotating mirror 446 sits in the path of a second beam 403. The system 400 may also include a processor or other controller (not shown) coupled to the stage 412, amplitude modulator 422, phase modulator 430, and rotating mirrors 444 and 446.

In operation, the amplitude modulator 422 and phase modulator 430 spatially modulate the first beam 401. For example, the first beam's wavefront may be modulated to have a quadratic curvature in one or two dimensions. The first beam 401 reflects off the first rotating mirror 444 and refracts into the holographic recording medium 408 via one prism 402a. The second beam 403, which has a planar wavefront, reflects off the second rotating mirror 446 and refracts into the holographic recording medium 408 via the other prism 402b to interfere with the first beam 401. The holographic recording medium 408 records the interference pattern formed by the first beam 401 and second beam 403 as a first holographic grating.

To record a second holographic grating, the system 400 adjusts the phase modulation and/or the amplitude modulation of the first beam 401 with the phase modulator 430 and/or amplitude modulator 422 as desired according to the process 360 for correcting the recording wavefronts shown in FIG. 3D. The second holographic grating can be multiplexed in space and/or angle with respect the first holographic grating by moving the holographic recording medium 408 and prisms 402 along the $z_G$ axis with the translation stage 412 and rotating the first rotating mirror 444 and/or the second rotating mirror 446 as desired.

Recording holographic grating structures by interfering first beams with quadratically curved wavefronts and second beams with planar wavefronts yields a quadratic spatial variance in the skew axis. The mean skew axis is set by the (skew) angle of the holographic recording medium 408, and the amount of power is set by the quadratic wavefront. In cases where the desired optical power is low, for example, less than one diopter, adequate performance might be achievable employing a static phase modulator to program the first beam with a quadratically curved wavefront instead of the full dynamic phase and amplitude modulation used in the system 400 of FIG. 4A.

FIG. 4B shows an alternative system 450 for writing spatially varying skew mirrors. It includes mirror-symmetric arms that phase-modulate and guide a first beam 451 and a second beam 453 to a holographic recording medium 458 sandwiched between a pair of prisms 452. The first beam 451 reflects off a pair of rotating mirrors 474 and 494, the first of which is mounted on a translation stage 470 that can move along the $x_G$ axis. A first phase modulator 480 modulates the wavefront of the first beam 451, which is relayed via one or more lenses and one of the prisms 452 to the holographic recording medium 458. Likewise, the second beam 453 reflects off a pair of rotating mirrors 476 and 496, the first of which is mounted on a translation stage 472 that can move along the $x_G$ axis. A second phase modulator 482 modulates the wavefront of the second beam 453, which is relayed via one or more lenses and the other prism 452 to the holographic recording medium 458.

The first beam 451 and second beam 453 interfere to produce interference patterns that the holographic recording medium 458 records as holographic gratings. The interference patterns can be multiplexed in the holographic recording medium 458 by rotating mirrors 474, 476, 494, and 496 and moving mirrors 474 and 476 along the $x_G$ axis with the translation stages 470 and 472. If the phase modulators 480 and 482 are dynamic (e.g., liquid-crystal SLMs), they can be used to vary the modulation of the wavefronts from holographic grating to holographic grating.

Those of skill in the art will readily appreciate that other recording architectures are also possible. For example, the phase modulators 480 and 482 and rotating mirrors 494 and 496 may be replaced by rotating deformable mirrors (e.g., as in FIG. 3D). And in any system, the phase and/or amplitude modulation can be static or dynamic, depending on the spatially varying skew mirrors being written. Similarly, the phase and amplitude in any system may be modulated by two phase modulators or two amplitude modulators in different planes.

2.3 Spatially Varying Skew Mirror Conformal Casting

FIGS. 5A-5C illustrate a process of conformal casting to make a spatially varying skew mirror. This is a modification of a process used to make a conventional skew mirror, where the holographic recording medium is cast between flat substrates—e.g., dispensed as a liquid precursor and cured to create a solid layer of holographic recording conforming to the substrates. In a conformal casting process, the liquid precursor is cast and cured between curved substrates to form a curved holographic recording medium that is used to record interference between recording beams with planar wavefronts, curved wavefronts, or both. The medium is delaminated and warped (e.g., flattened) between a pair of substrates to form a spatially varying skew mirror. In other words, warping a conventional skew mirror formed in a physically curved substrate yields a physically flat, spatially varying skew mirror. Similarly, warping the physical substrate of a conventional skew mirror yields a spatially varying skew mirror.

FIG. 5A shows one example of conformal casting using a bottom substrate 502b resembling a plano-concave lens and a top substrate 502a resembling a plano-convex lens. In this embodiment, the curved casting substrates 502a and 502b (collectively, curved casting substrates 502) have the same radius of curvature, r, called the casting radius. In other embodiments, they may have different radii of curvature; for example, one substrate may be flat and the other substrate may be curved. The curved surfaces of the curved casting substrates 502 may be cylindrical or spherical, as shown in FIG. 5A, or any other suitable shape, include parabolic, parabaloidal, corrugated, or freeform.

A media precursor is disposed between the curved casting substrates 502 and cured to form a curved holographic recording medium 508 of uniform thickness in this example. This curved holographic recording medium 508 and curved casting substrates 502 form a flat package that can be used to record holographic gratings formed by interfering planar wavefronts, curved wavefronts, or combinations of planar and curved wavefronts. This flat package can fit between the prisms for recording in an ordinary skew mirror recording set up.

For example, the flat package may be treated as an ordinary flat skew mirror that is recorded by interfering planar wavefronts to produce a holographic grating structure 514 with a skew axis 501 that is constant with respect to the flat package's external surfaces/dimensions as shown in FIG. 5A. (The parallel angled dashed lines shown in FIG. 5A correspond to the skew axis 501 at various locations along the skew mirror.) Though the holographic recording medium 508 is physically non-flat, the entire skew mirror package (including the substrates 502) is optically flat, so the skew axes 501 are all parallel in FIG. 5A. The recording process transforms the holographic recording medium 508 into a holographic grating medium as discussed above.

Next, the recorded skew mirror of FIG. 5A is delaminated from the curved casting substrates 502, and subsequently re-laminated to substrates of a different curvature to form a spatially varying skew mirror 500. This re-lamination stretches, compresses, twists, and/or distorts the holographic grating medium and the holographic grating structure recorded in the holographic grating medium. Warping the holographic grating structure causes a spatial variation in the skew axes' orientations that can be used to produce optical power. As the recorded holographic grating medium 510 may be compliant, it may substantially conform to the shape of the new substrates 520. In some embodiments, an index-matching liquid or an optically clear bonding layer(s) may be used to afford optical clarity and/or physical integrity.

In the embodiment illustrated by FIG. 5B, the new substrates are flat substrates 520a and 520b (collectively, substrates 520). As the recorded holographic grating medium 510 conforms to a new shape, the skew axes 501' at various locations along the skew mirror 500 may no longer be parallel with each other as indicated by the non-parallel dashed lines in FIG. 5B. In the skew mirror 500 shown in FIG. 5B, the non-parallel skew axes 501' may cause the skew mirror 500 to act as a mirror with optical power. This focusing skew mirror 500 has a focal length f approximately equal to half of the casting radius r (i.e., f≈r/2). The non-flat skew mirror 500 shown in FIG. 5B may be illuminated from either or both sides. For example, a skew mirror with focal length f may be used as a converging mirror from one side, and/or a diverging mirror from the other.

In other embodiments, the conforming skew axis as a function of spatial location, $\phi(x, y)$, may be determined by some other method. In some embodiments, $\phi(x, y)$ may be determined from a function of the gradient of the casting substrates; in some embodiments $\phi(x, y)$ may be determined using finite element analysis incorporating material properties and forces on the re-laminated skew mirror.

The holographic grating medium can also be re-laminated onto non-flat substrates. In one embodiment, illustrated in FIG. 5C, the new substrates 520a' and 520b' (collectively, substrates 520') have the opposite curvature of the curved casting substrates 502. This confers a focal length of approximately $¼^{th}$ the casting radius (i.e., f≈r/4), and may advantageously assume a physically bi-stable state of the holographic grating medium 510' ("turned inside out"). In some embodiments, an inside-out skew mirror may not require re-lamination to a new substrate. Put differently, the bare media can hold this "inside-out" shape, so it can be used without substrates.

Since the final skew axes function $\phi(x, y)$ is a function of both the casting substrates and the final conformal shape of the recording layer, very nearly arbitrary $\phi(x, y)$ functions may be realized. Example skew axes functions include but are not limited to cylindrical, spherical, parabolic, parabaloidal, and freeform. In some embodiments, a $\phi(x, y)$ function may be used to correct projector aberrations or otherwise be jointly optimized for an external application.

3 Applications of Spatially Varying Skew Mirrors

Spatially varying skew mirrors can used for a variety of applications. They are particularly useful for head-mounted displays (HMDs) used for augmented, virtual, and/or mixed reality. For instance, a spatially varying skew mirror can increase the field-of-view (FoV) and/or vary the focal plane placement of an HMD. It can also be used to track the eye(s) of someone wearing an HMD.

3.1 Increasing the Field-of-View (FoV) of Reflective Head-Mounted Displays (HMDs)

Figure 6B:
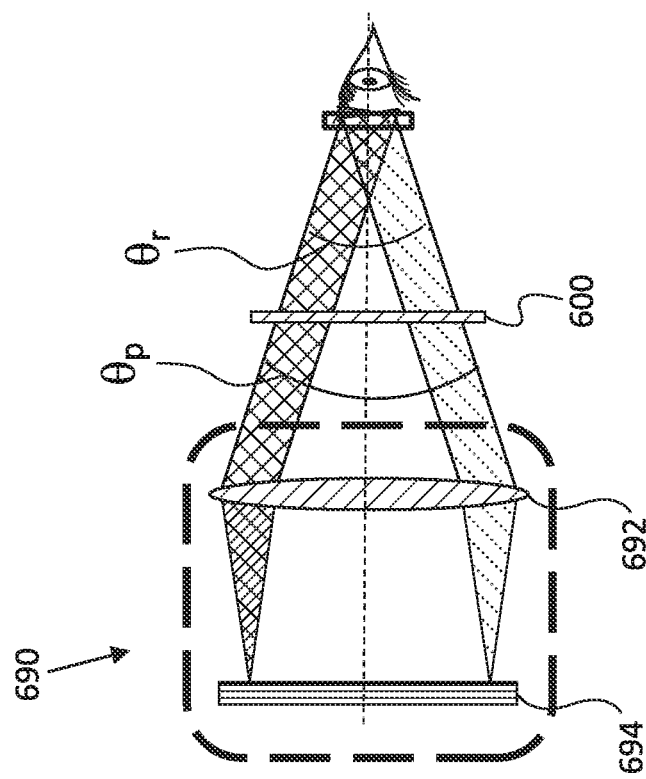
FIG. 6B is an unfolded view of an HMD with a conventional skew mirror.
Figure 6A:
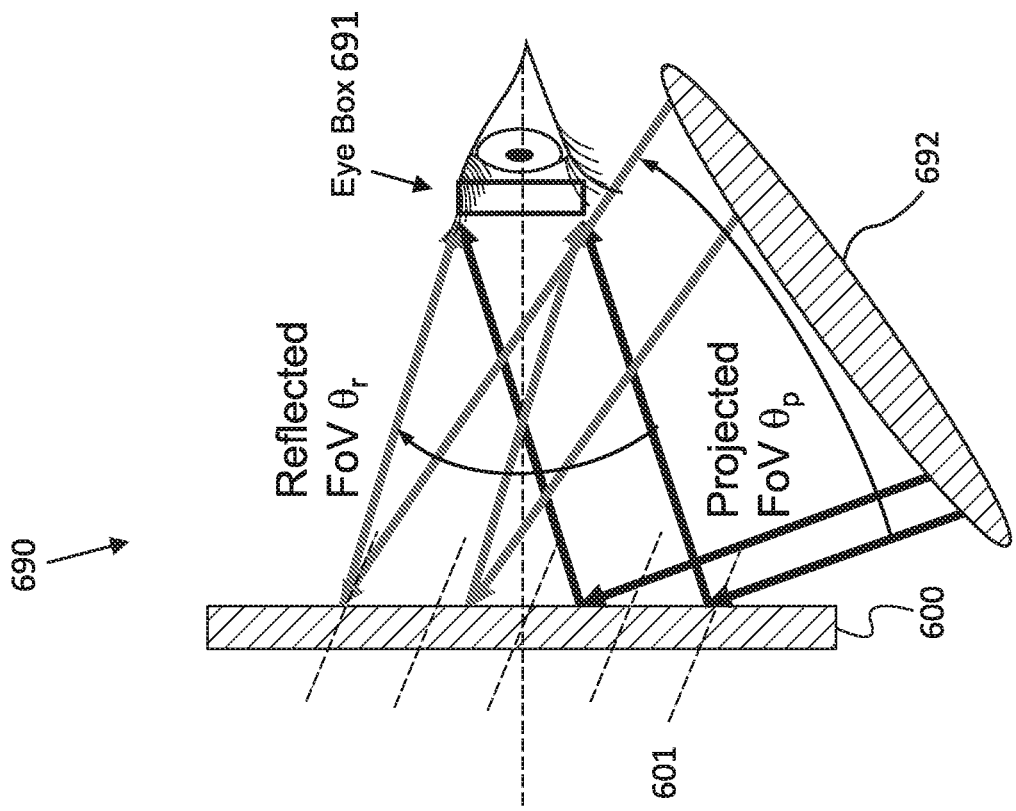
FIG. 6A is a profile view of a head-mounted display (HMD) with a conventional skew mirror.

FIGS. 6A and 6B show a profile view and a conceptual unfolded view, respectively, of a reflective HMD 690 with a conventional skew mirror 600. They illustrate the limitations on FoV using a conventional skew mirror in an HMD. A lens 692 projects an image of a display 694 over a projected FoV. The skew mirror 600 reflects the image over a reflected FoV to the user's eye 691. This causes the user to perceive the image of the display 694 over a particular FoV.

In FIG. 6A, the angled dashed lines correspond to the skew axis 601 at various locations along the skew mirror 600. The skew mirror 600 is flat and the skew axes 601 are parallel to each other, so the projected FoV, $\theta_p$, is equal to the reflected FoV, $\theta_r$, which may be up to about 15-20 degrees. In configurations where Snell's law is considered, the projected FoV may actually be larger than the reflected FoV. In either case, there should be enough room in the HMD 690 between the lens 692 and the skew mirror 600 for a large projected light cone to reach the skew mirror 600 to produce a comparatively small reflected light cone. Adding optical power to the skew mirror 600 would allow the projected FoV to be smaller than the reflected FoV, reducing the size of the projected light cone compared to the reflected light cone and increasing the obtainable FoV, reducing the size of the HMD 690, or both.

3.2 Reflective FoV Improvements from Optical Power

Figure 7B:
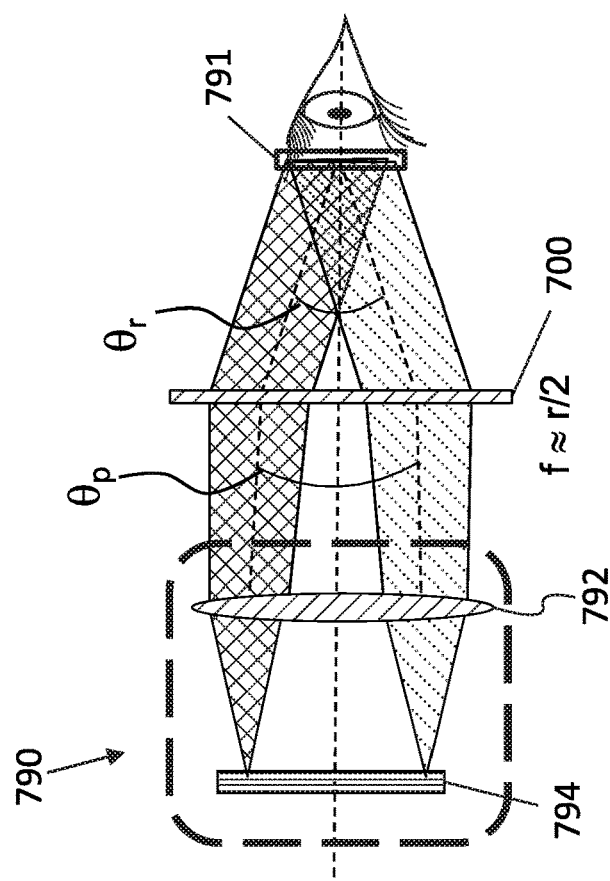
FIG. 7B is an unfolded view of an HMD with a spatially varying skew mirror.
Figure 7A:
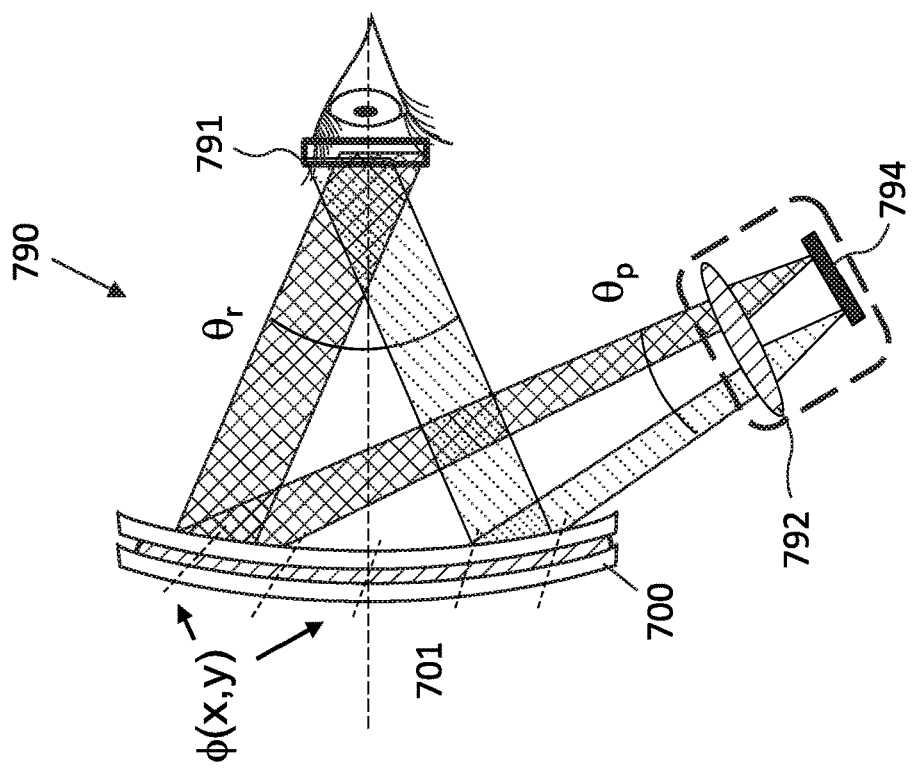
FIG. 7A is a profile view of an HMD with a spatially varying skew mirror.
Figure 7C:
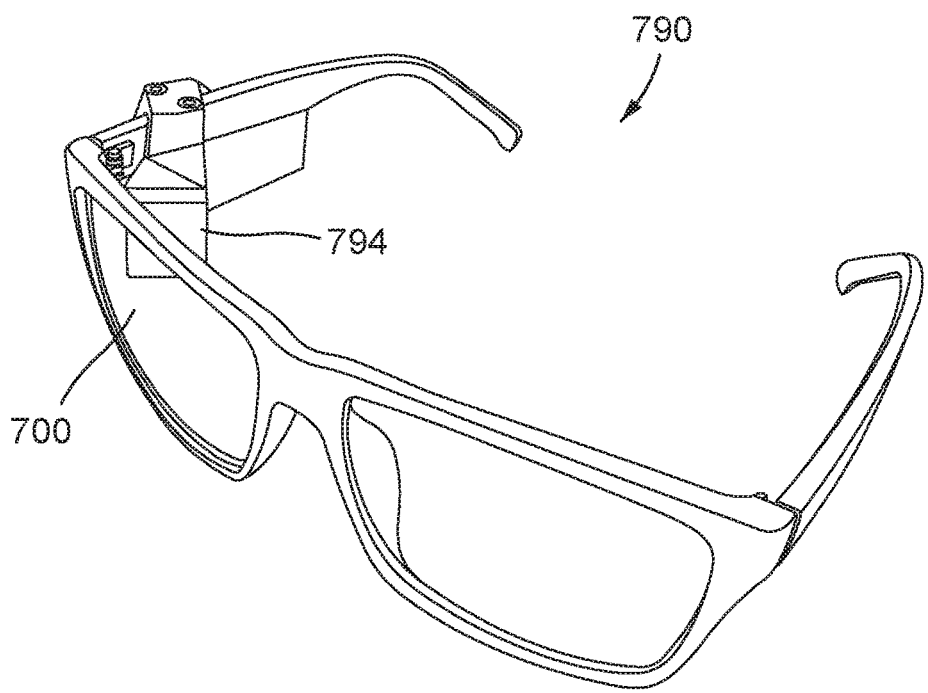
FIG. 7C is a photograph of an HMD with a spatially varying skew mirror.
Figure 7D:
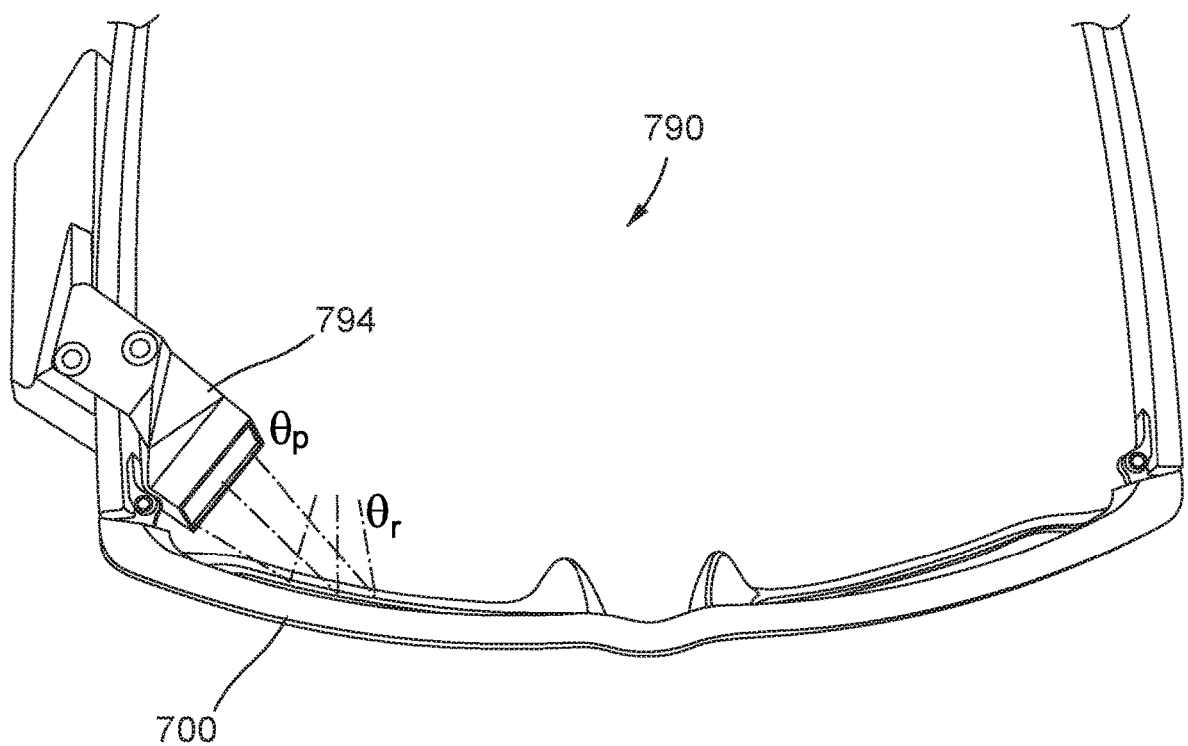
FIG. 7D is a close-up photograph of an HMD with a spatially varying skew mirror.

FIGS. 7A and 7B show a profile view and an unfolded view, respectively, of a reflective HMD 790 with a spatially varying skew mirror 700 with positive optical power. FIGS. 7C and 7D are annotated photograph of the HMD 790, with the rays in FIG. 7D corresponding to the beams shown in FIG. 7A. The HMD 790 shown in FIGS. 7C and 7D includes the spatially varying skew mirror 700 embedded in one lens of a rimmed eyewear frame. This lens can be flat or curved, depending on the style of the eyewear and the optical power of the lens.

FIGS. 7A-7D illustrate the projected FoV increases that can be obtained using skew mirrors with positive optical power (e.g., any value up to about 10 Diopters, including 0.5 Diopters, 1 Diopter, 2 Diopters, 5 Diopters, and 10 Diopters). Increasing the projected FoV offers a number of advantages, including the possibility of use a smaller, more compact display to achieve a given projected FoV. Compared to a system with a conventional skew mirror, the optics in the HMD 790 may be smaller by a ratio of about $\theta_r/\theta_p$. A smaller display may consume less electrical power than a larger display, leading to longer battery life and/or smaller, lighter HMD.

The skew mirror 700 is curved with skew axes 701 that are not parallel to each other as shown in FIG. 7A. (In FIG. 7B, the skew mirror 700 is depicted as a rectangle for simplicity.) It is situated between the user's eye 791 and a display 794 and a lens 792. In operation, the lens 792 relays an image of the display via the skew mirror 700. The lens 792 is positioned closer to the display 794 so as to produce diverging beams that may become collimated upon reflection by the skew mirror. The beams may also be diverging to focus at a plane closer than infinity. However, the incident beams should diverge more than the reflected beams because the spatially varying skew mirror 700 in this example has positive power.

Because the skew mirror 700 has positive optical power, the reflected FoV is larger than the projected FoV, i.e., $\theta_r > \theta_p$. For instance, the projected FoV may be about 15 degrees and the reflected FoV may be about 50 degrees. The amount of optical power varies inversely with the focal length, f, of the skew mirror 700; for a conformally cast skew mirror, the focal length is approximately equal to half of the casting radius, r, as explained above. With a flat skew mirror, the skew mirror's focal length goes to infinity and $\theta_r \approx \theta_p$.

Figure 8:
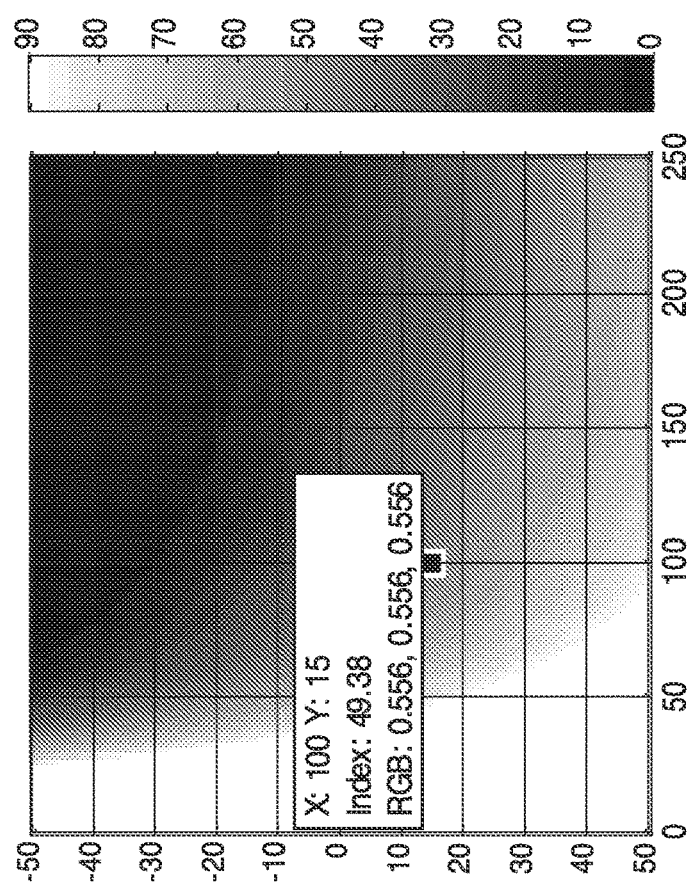
FIG. 8 is a plot of reflected and projected fields-of-view (FoVs) versus casting radius for conformally cast spatially varying skew mirrors.

FIG. 8 is a plot that shows the reflected FoV $\theta_r$ obtainable as a function of the casting radius r and the projected field of view, $\theta_p$. The reflected FoV is determined from a simple paraxial y u ray trace familiar to those skilled in the art, and may diverge from the true value in the non-paraxial regime. FIG. 8, nevertheless, still illustrates the large gains available qualitatively. The indicated data point shows that a skew mirror with a focal length of f=50 mm (r=100 mm) can convert a projected FoV of only 15° into a reflected FoV of about 49.4°.

3.3 Waveguide HMD Focal Plane Placement

In some embodiments, a spatially varying skew mirror coupler, such as an output coupler, a cross coupler, or an input coupler may be used. A skew mirror coupler is a skew mirror inside of a waveguide. It couples light into or out of the waveguide and/or reflects light within the waveguide. A spatially varying skew mirror as an output coupler may be used to place the focal plane of the image viewed by the user of an HMD at a certain depth with respect to the user's eye(s). If the output coupler has a negative focal length, the focal plane will be in front of the user at a finite distance. Multiple focal planes may be placed using multiple waveguides, each with output couplers of differing power.

Figure 9:
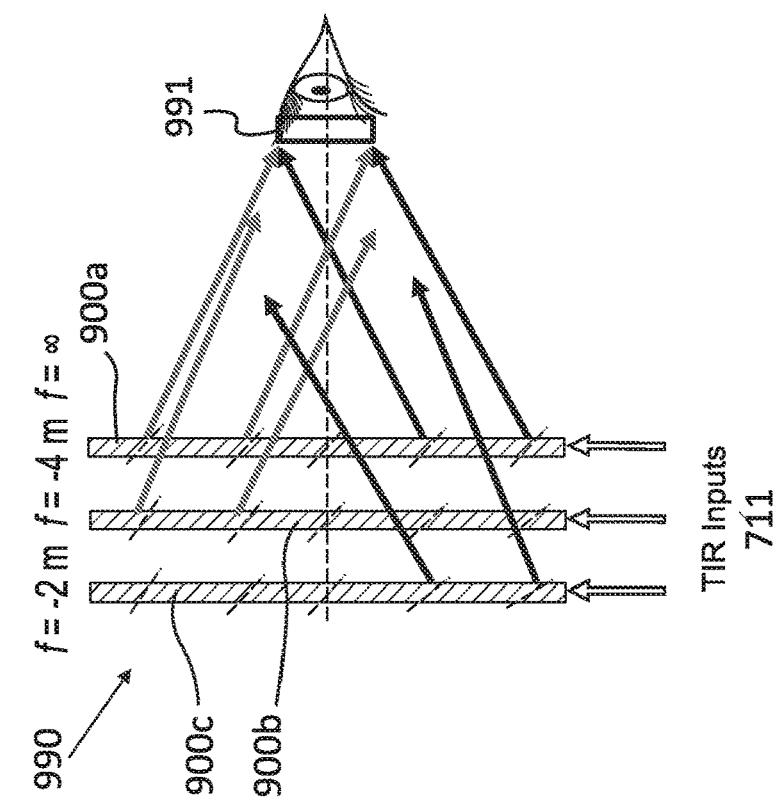
FIG. 9 is a profile view of a multi-focal plane waveguiding HMD with several spatially varying skew mirrors and a conventional skew mirror.

FIG. 9 illustrates such a multi-focal plane HMD 990 with three focal planes and three separate waveguides with skew mirror output couplers 900a-900c (collectively, output couplers 900). The waveguides are separate; each waveguide has its own holographic medium layer and substrates. The waveguides may be separated by air gaps as shown in FIG. 9 or low-index substrates, although using low-index substrate may limit the FoV. The skew mirror output couplers 900 guide and project totally internally reflected (TIR) inputs 711 towards the user's eye 991.

The right-most waveguide (f=∞) contains a conventional flat skew mirror output coupler 900a according to embodiments of related inventions. It reflects an afocal image propagating in the waveguide as an afocal image propagating towards the eye 991, which perceives the afocal image as a virtual image focusing at infinity. The middle waveguide contains an optical power output coupler 900b with a negative focal length, which projects an image towards the eye 991 that focuses at 4 meters from the eye. The left-most waveguide contains an optical power output coupler 900c with a longer negative focal length, which projects an image towards the eye 991 that focuses at 2 meters from the eye.

One skilled in the art will realize that any number of image focal planes may be so generated. In some embodiments, a single waveguide projects an image at a focal plane other than infinity. In other embodiments, a plurality of waveguides are used to approximate a continuum of focal planes, allowing a user to perceive a natural 4D light field. In some embodiments, the obtainable FoV for closer focal planes might be smaller than the obtainable FoV for farther ones.

4 Experimental Demonstration of a Spatially Varying Skew Mirror with Optical Power To demonstrate that the skew axis can be optically programmed spatially across the skew mirror, multiple grating medium samples were exposed with varying amounts of wavefront curvature using the fabrication embodiment shown in FIG. 4A. The wavefront curvature for the first recording beam was held constant and flat, while the second recording beam's wavefront was varied from flat to increasing amounts of quadratic phase but held constant for a single recording. Therefore, the skew mirrors fabricated with quadratic phase in one of the beams should exhibit optical power as there should be a quadratic spatial variance in the skew axis that is superimposed on the average skew axis.

Figure 10:
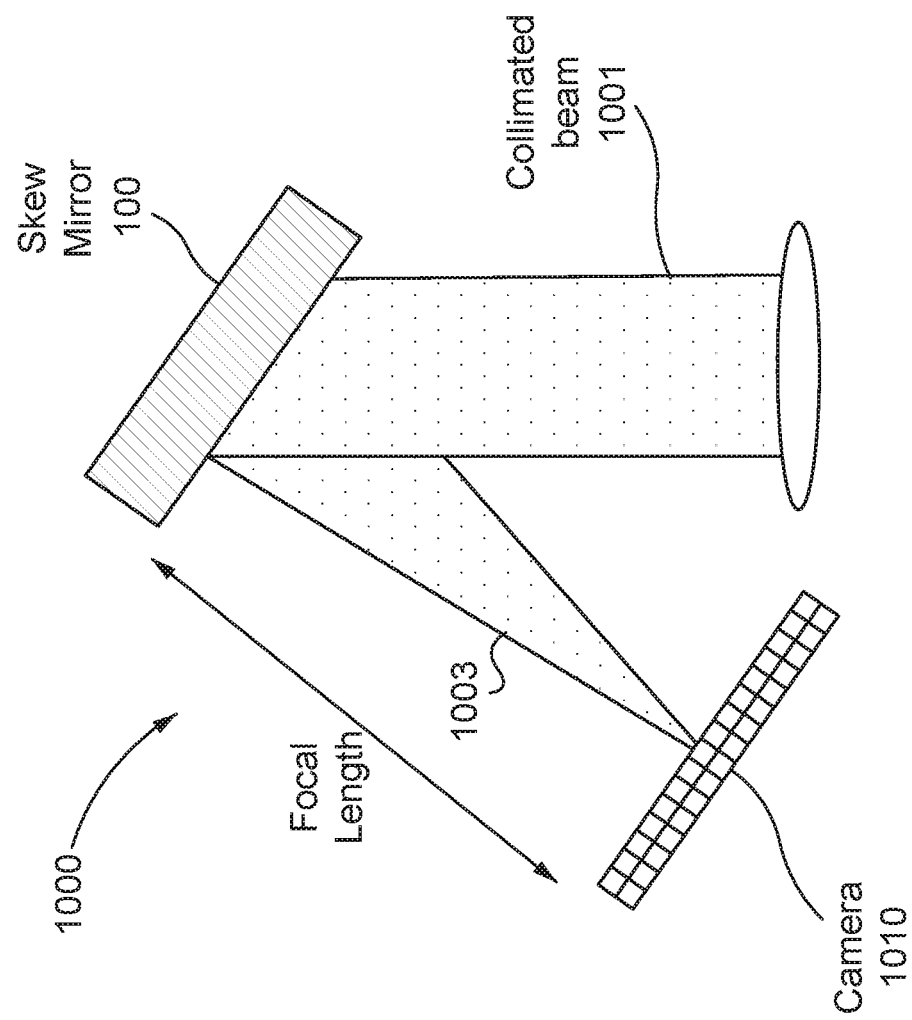
FIG. 10 shows a metrology platform for measuring the modulation transfer function (MTF) of a skew mirror.

FIG. 10 shows a modulation transfer function (MTF) metrology platform 1000 used to measure the optical power (focal length) of the fabricated spatially varying skew mirrors. This platform 1000 can be used to generate corrections for the precursor wavefront in the process 360 of FIG. 3D. A collimated beam 1001 (e.g., at a wavelength of 532 nm) illuminates the spatially varying skew mirror 100 under test. The skew mirror 100 reflects the collimated beam 1001 about a spatially varying ensemble of skew axes to produce a focused beam 1003 that propagates towards a detector array 1010 positioned opposite the skew mirror 100 at distance equal to the nominal focal length of the skew mirror 100.

The detector array 1010 was mounted on a translation stage and could be translated back and forth with respect to the skew mirror 100. The spot size formed by the focused beam 1003 on the detector array 1010 varies with respect to the distance between the detector array 1010 and the skew mirror 100: it has the smallest radius when the detector array 1010 is in the skew mirror's focal plane. Similarly, an image reflected by the skew mirror 100 appears in sharpest focus when the detector array 1010 is in the focal plane.

TABLE 2 shows MTF metrology measurements of the sample skew mirrors A-C, which were fabricated and measured using the system 400 of FIG. 4A. The amount of optical power measured varied among the samples from 0 to 0.66 diopters with an average skew axis of 13 degrees:

TABLE 2

| | | Metrology of fabricated skew mirrors | | |
|---|---|---|---|---|
| First Recording Wavefront | Second Recording Wavefront | Measured Focal Length (m) @ 532 nm | Optical Power (D) @ 532 nm | Measured Internal Skew Axis (deg) |
| Sample A | Flat | Flat | Infinite | 0 | 13 |
| Sample B | Flat | Converging (~2 m focal length) | 1.516 | 0.66 | 13 |
| Sample C | Flat | Converging (~4 m focal length) | 3.2 | 0.31 | 13 |

Figure 11A:
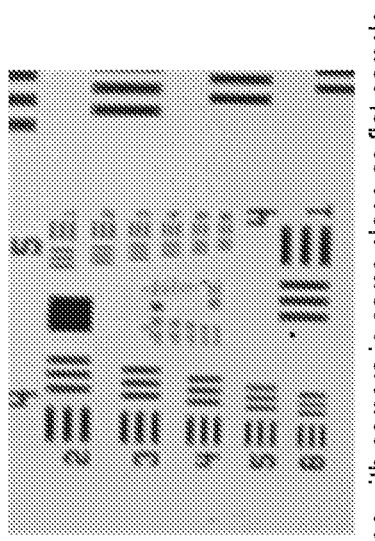
FIG. 11A shows an image of a resolution test chart reflected by a spatially varying skew mirror with 0.66 Diopters of optical power at the best focus position for a conventional skew mirror.
Figure 11B:
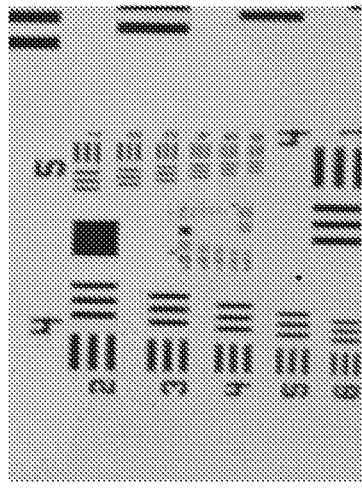
FIG. 11B shows an image of a resolution test chart by from a spatially varying skew mirror with 0.66 Diopters of optical power.

To further demonstrate the existence of optical power in samples B and C, samples A and B were used to image a resolution test chart. The position of the camera 1010 of the MTF metrology system 1000 was set by sample A (the sample with no optical power), then sample B was inserted into the MTF metrology system. FIG. 11A shows the picture of the resolution target acquired with sample B at the best focus position for sample A. FIG. 11B shows the picture of the resolution target acquired by placing sample B in the same position as sample A, then translating the camera 1010 by 150 µm. Comparing FIGS. 11A and 11B shows that the translating the camera causes the image to appear sharper (better focus). If sample B had no optical power the focal plane of the imaging system would not require adjustment.

Figure 12B:
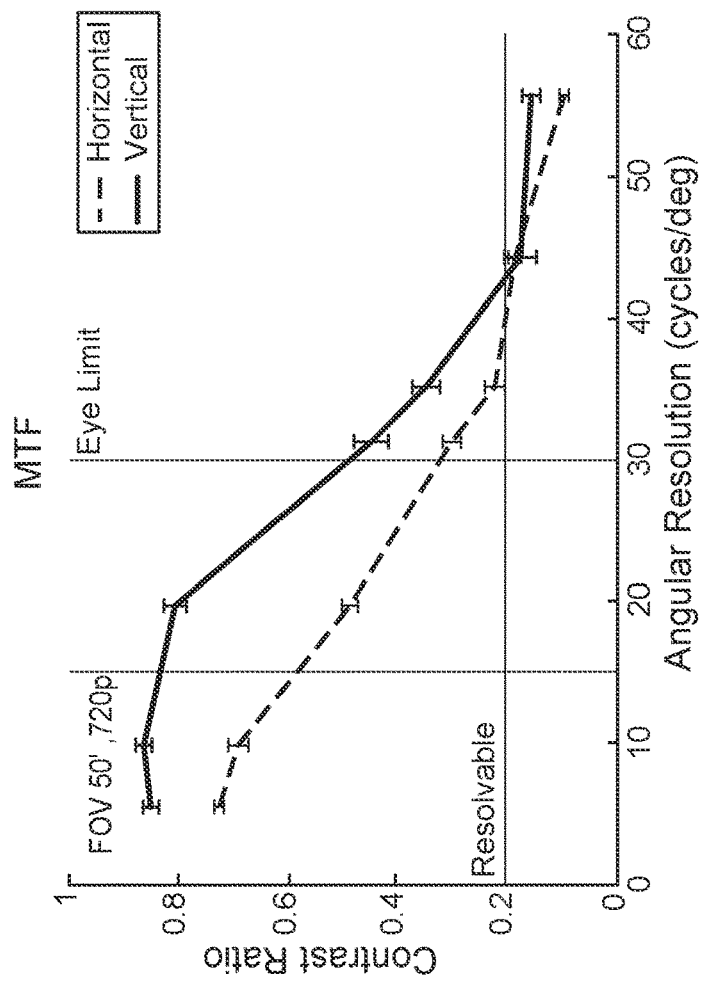
FIG. 12B is a plot of contrast ratio versus angular resolution for a conventional skew mirror as measured with the metrology platform of FIG. 10.
Figure 12A:
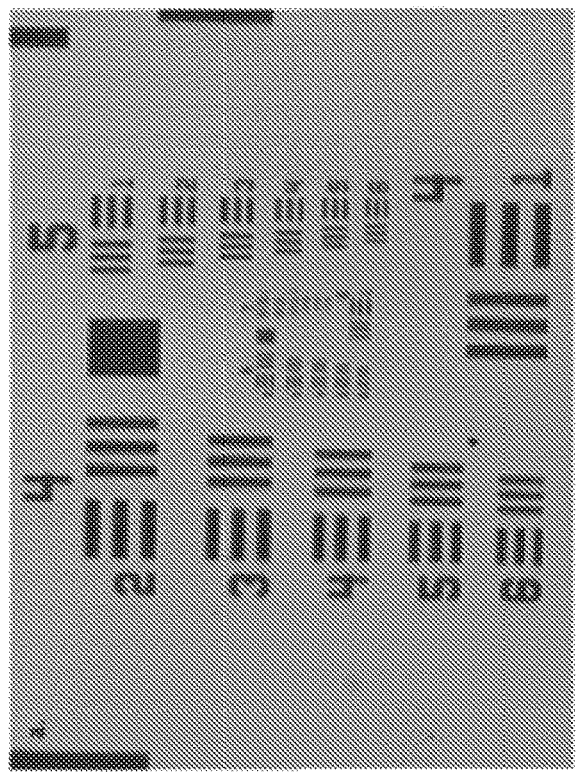
FIG. 12A shows an image of a resolution test chart reflected from a conventional skew mirror.
Figure 14A:
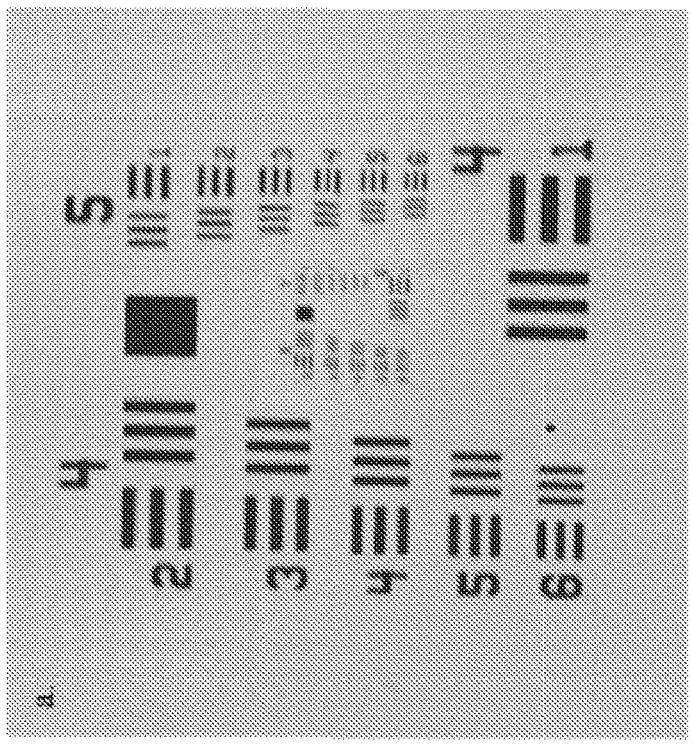
FIG. 14A shows an image of a resolution test chart reflected from a spatially varying optical skew mirror with 0.31 Diopters of optical power.
Figure 14B:
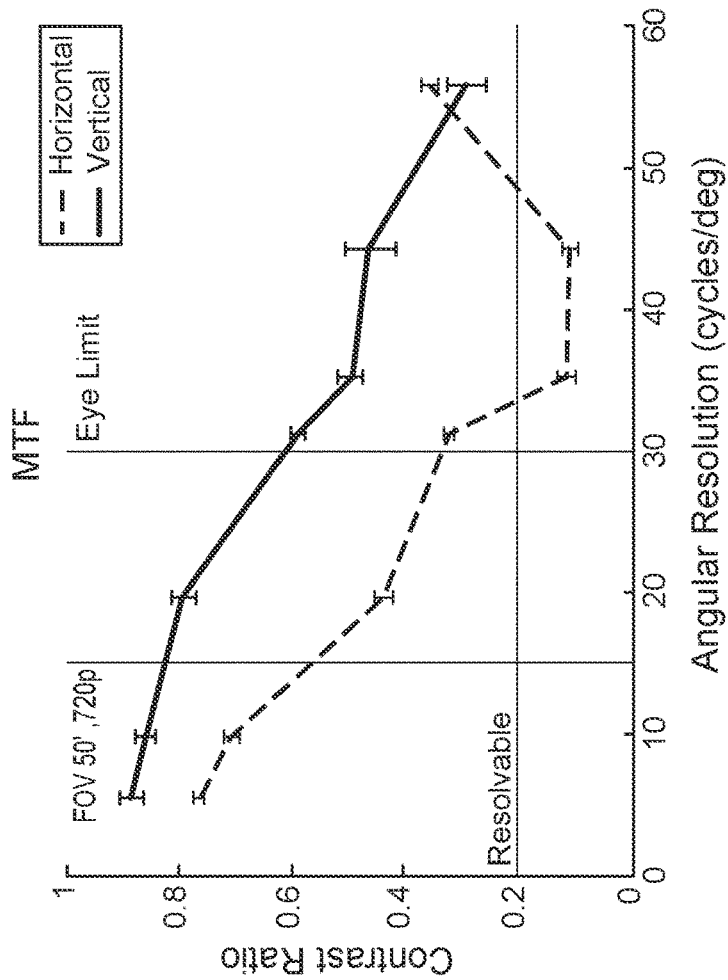
FIG. 14B is a plot of contrast ratio versus angular resolution for a spatially varying optical skew mirror with 0.31 Diopters of optical power as measured with the metrology platform of FIG. 10.

FIGS. 12A, 13A, and 14A show pictures of the resolution test chart reflected of samples A, B, and C, respectively. In each case, the camera 1010 was moved for sharpest resolution. FIGS. 12B, 13B, and 14B are plots of the contrast ratio versus angular resolution for samples A, B, and C, respectively. The upper trace in each plot represents the vertical contrast ratio, and the lower trace in each plot represents the horizontal contrast ratio. The MTF plots in FIGS. 13B and 14B demonstrate that adding under a diopter of optical power does not significantly affect the achievable resolution of a skew mirror, as sample B still resolves the angular resolution of the eye.

5 Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

References in the specification to "one embodiment," "an embodiment," "another embodiment," "a preferred embodiment," "an alternative embodiment," "one variation," "a variation," and similar phrases mean that a particular feature, structure, or characteristic described in connection with the embodiment or variation, is included in at least an embodiment or variation of the invention. The phrases "in one embodiment," "in one variation," and similar phrases, as used in various places in the specification, are not necessarily meant to refer to the same embodiment or the same variation.

The term "approximately," as used in this specification and appended claims, refers to plus or minus 10% of the value given. When the term "approximately" is used together with an angular value, it refers to a range of angles within 0.5 degrees of that angular value (e.g., the phrase "approximately 0 degrees" refers to "±0.5 degrees").

The term "about," as used in this specification and appended claims in conjunction with a numerical value, refers to plus or minus 20% of the numerical value. When the term "about" is used together with an angular value, it refers to a range of angles within 1.0 degrees of that angular value (e.g., the phrase "about 0 degrees" refers to "±1.0 degrees").

The term "generally," as used in this specification and appended claims, means mostly or for the most part.

The term "principally," as used in this specification and appended claims with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light.

The term "reflective axis," as used in this specification and appended claims, refers to an axis that bisects an angle of an incident light ray relative to its reflected light ray. The incident light ray, reflective axis, and reflected light ray all reside in one common plane, which can be referred to as a plane of incidence. The plane of incidence for a skew mirror need not include surface normal, although it may. The magnitude of an angle of incidence of the incident light ray relative to the reflective axis is equal to the magnitude of an angle of reflection of the reflected light ray relative to the reflective axis. For purposes of the foregoing definition of "reflective axis," the angles are internal angles. For conventional dielectric and metal mirrors, the reflective axis is coincident with surface normal, i.e., the reflective axis is perpendicular to the mirror surface, as is the plane of incidence. Conversely, embodiments of skew mirrors according to the present invention may have a reflective axis that differs from surface normal, or may have a reflective axis that is coincident with surface normal. Angles of incidence and angles of reflection are usually, but not necessarily, determined empirically, with multiple measurements (generally three or more) typically used to generate a mean value.

The term "skew axis" as used in this disclosure refers to an axis that represents/coincides with the average direction of grating vectors at a particular spatial location in a grating medium, for one or more volume phase holograms residing at the particular spatial location in the grating medium. Thus, the skew axis has a skew angle that is identical to the average of grating vector angles of the one or more volume phase holograms at the particular location. Persons skilled in the art, given the benefit of this disclosure, will recognize that the grating vector direction for a volume phase hologram is determined by the difference of the wave vectors of the recording beams used to record the volume phase holograms. The reflective axis at the particular location is very similar to the skew axis, though not necessarily identical. The skew angle can be substantially identical to the reflective axis angle, meaning the skew angle is within 1.0 degree of the reflective axis angle. Persons skilled in the art, given the benefit of this disclosure, will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle.

Practically, a spatially varying skew mirror will have "skew axes" and "reflective axes" that are indistinguishable from each other or very close to each other at a given location in the spatially varying skew mirror. In recognition of this, a skew axis/reflective axis is generally called a skew axis in the context describing orientation of gratings or recording beams in a grating medium, and as a reflective axis when referring to light reflective properties of a skew mirror.

The term "reflection" and similar terms are used in this disclosure in some cases where diffraction might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to diffract incident light, since grating structures are generally thought to act on light by diffraction. However, such use of the term "diffract" would result in expressions such as "incident light is diffracted about substantially uniform reflective axes," which could be confusing. Accordingly, where incident light is said to be "reflected" by a grating structure, persons of ordinary skill in art, given the benefit of this disclosure, will recognize that the grating structure is "reflecting" the light by a diffraction. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The terms "hologram" and "holographic grating," as used in this specification and appended claims, refer to a recording of an interference pattern generated by interference between multiple intersecting light beams. A hologram or holographic grating is an example of a grating structure.

6 Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. A holographic optical element comprising:
a grating structure in a grating medium, wherein the grating structure is configured to reflect an incident collimated beam about spatially varying skew axes to form a reflected beam having a reflected wavefront characterized by a non-zero third-order or higher Zernike coefficient, the spatially varying skew axes forming non-zero angles with a surface normal of the surface of the grating medium in at least some spatial locations and the grating structure comprising:
a first grating disposed at a first location in the grating medium and characterized by a first grating vector having a first length and pointing in a first direction, and
a second grating disposed at the first location in the grating medium and characterized by a second grating vector having a second length and pointing in the first direction, the second length being different than the first length.
2. The holographic optical element of claim 1, wherein the spatially varying skew axes have orientations that vary smoothly as a function of position within the grating medium.
3. The holographic optical element of claim 1, wherein the grating structure is configured to focus the reflected beam to a virtual focal point.
4. The holographic optical element of claim 3, wherein the virtual focal point is 1 meter to 10 meters from the grating structure.
5. The holographic optical element of claim 1, wherein the grating structure is configured to focus the reflected beam to a real focal point.
6. The holographic optical element of claim 5, wherein the real focal point is 1 meter to 10 meters from the grating structure.
7. The holographic optical element defined in claim 1, wherein the grating medium is located within a waveguide.
8. The holographic optical element defined in claim 7, wherein the waveguide is located within a head-mounted display.
9. A holographic optical element comprising:
a grating structure residing in a grating medium, wherein the grating structure is configured to reflect an incident collimated beam about spatially varying skew axes to form a reflected beam having a reflected wavefront characterized by a non-zero third-order or higher Zernike coefficient, the spatially varying skew axes forming non-zero angles with a surface normal of the surface of the grating medium in at least some spatial locations the grating structure comprising:
a first distribution of gratings disposed at a first location in the grating medium and having a first distribution of spatial frequencies and oriented in a first distribution of directions, and
a second distribution of gratings disposed at a second location in the grating medium and having a second distribution of spatial frequencies different than the first distribution of spatial frequencies and oriented in a second distribution of directions, the second distribution of directions being substantially the same as the first distribution of directions.
10. An optical reflecting device comprising:
a grating medium;
a grating structure occupying a volume within the grating medium, wherein:
the grating structure is structured to reflect incident light having a first wavelength and a first range of incidence angles about a substantially uniform first reflective axis, the incident light being incident upon a surface of the grating medium at a first location,
the grating structure is structured to reflect incident light having a second wavelength and a second range of incidence angles about a substantially uniform second reflective axis, the light being incident upon the surface of the grating medium at a second location, and
the substantially uniform first reflective axis differs from the substantially uniform second reflective axis by at least 0.1 degrees.
11. The optical reflecting device of claim 10, wherein:
the first wavelength differs from the second wavelength by at least 50 nm; and
the first range of incidence angles is the same as the second range of incidence angles.
12. The optical reflecting device of claim 11, wherein the first range of incidence angles is at least 15 degrees.

* * * * *